United States Patent
Ellis

(10) Patent No.: US 10,382,828 B2
(45) Date of Patent: Aug. 13, 2019

(54) INTERACTIVE TELEVISION SYSTEMS WITH DIGITAL VIDEO RECORDING AND ADJUSTABLE REMINDERS

(71) Applicant: Rovi Guides, Inc., San Jose, CA (US)

(72) Inventor: Michael D. Ellis, Boulder, CO (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/852,144

(22) Filed: Dec. 22, 2017

(65) Prior Publication Data

US 2018/0192152 A1    Jul. 5, 2018

Related U.S. Application Data

(63) Continuation of application No. 15/403,321, filed on Jan. 11, 2017, now Pat. No. 9,854,322, which is a
(Continued)

(51) Int. Cl.
*H04N 21/488* (2011.01)
*H04N 5/445* (2011.01)
(Continued)

(52) U.S. Cl.
CPC ..... *H04N 21/4882* (2013.01); *H04N 5/44543* (2013.01); *H04N 21/23113* (2013.01);
(Continued)

(58) Field of Classification Search
CPC ........... H04N 21/4882; H04N 5/44543; H04N 21/23113; H04N 21/242; H04N 21/262;
(Continued)

(56) References Cited

U.S. PATENT DOCUMENTS

| 5,568,181 A * | 10/1996 | Greenwood | H04N 7/17336 |
| | | | 348/E7.073 |
| 5,751,282 A * | 5/1998 | Girard | H04N 5/44543 |
| | | | 348/E5.105 |

(Continued)

FOREIGN PATENT DOCUMENTS

| JP | 6-180894 | 6/1994 |
| JP | 2002-185941 | 6/2002 |

OTHER PUBLICATIONS

SonicBlue, ReplayTV 4000 user's guide, 2001 pp. 20 and 34. (Year: 2001).*

(Continued)

*Primary Examiner* — Hunter B Lonsberry
(74) *Attorney, Agent, or Firm* — Haley Guiliano LLP

(57) ABSTRACT

An interactive television system is provided in which an interactive television application is used to support network-based or local personal video recorder capabilities. A user may use this application to view lists of program listings. The user may select a program listing of interest. The interactive television application may allow the user to set a reminder for the selected program at the scheduled broadcast time. This application may also allow the user to set a reminder for the selected program at a later time at which the program is not scheduled to be broadcast. The user may be provided with a reminder at this later time. In response, the user may direct the network-based or local personal video recorder to play back the program or may defer the reminder again. The interactive television application may collect information on program usage and popularity to determine how long to retain certain programming.

15 Claims, 33 Drawing Sheets

Related U.S. Application Data continuation of application No. 15/154,109, filed on May 13, 2016, now Pat. No. 9,591,373, which is a continuation of application No. 14/741,034, filed on Jun. 16, 2015, now Pat. No. 9,369,741, which is a continuation of application No. 14/313,348, filed on Jun. 24, 2014, now Pat. No. 9,071,872, which is a continuation of application No. 13/866,247, filed on Apr. 19, 2013, now Pat. No. 8,806,546, which is a continuation of application No. 13/112,078, filed on May 20, 2011, now Pat. No. 8,799,971, which is a continuation of application No. 12/827,046, filed on Jun. 30, 2010, now Pat. No. 7,971,222, which is a continuation of application No. 12/350,393, filed on Jan. 8, 2009, now Pat. No. 7,779,445, which is a continuation of application No. 10/357,001, filed on Jan. 30, 2003, now Pat. No. 7,493,646.

(51) Int. Cl.
  *H04N 21/2747* (2011.01)
  *H04N 21/4147* (2011.01)
  *H04N 21/4335* (2011.01)
  *H04N 21/443* (2011.01)
  *H04N 21/472* (2011.01)
  *H04N 21/482* (2011.01)
  *H04N 21/458* (2011.01)
  *H04N 21/231* (2011.01)
  *H04N 21/242* (2011.01)
  *H04N 21/262* (2011.01)
  *H04N 21/431* (2011.01)
  *H04N 21/438* (2011.01)
  *H04N 21/6587* (2011.01)
  *H04N 21/84* (2011.01)
  *H04N 21/434* (2011.01)

(52) U.S. Cl.
  CPC ......... *H04N 21/242* (2013.01); *H04N 21/262* (2013.01); *H04N 21/2747* (2013.01); *H04N 21/4147* (2013.01); *H04N 21/4312* (2013.01); *H04N 21/4335* (2013.01); *H04N 21/4343* (2013.01); *H04N 21/4383* (2013.01); *H04N 21/4438* (2013.01); *H04N 21/4583* (2013.01); *H04N 21/472* (2013.01); *H04N 21/47214* (2013.01); *H04N 21/47217* (2013.01); *H04N 21/4821* (2013.01); *H04N 21/6587* (2013.01); *H04N 21/84* (2013.01)

(58) Field of Classification Search
  CPC ........... H04N 21/2747; H04N 21/4147; H04N 21/4312; H04N 21/4335
  See application file for complete search history.

(56) References Cited

U.S. PATENT DOCUMENTS

| | | | | |
|---|---|---|---|---|
| 6,236,395 | B1* | 5/2001 | Sezan | H04N 5/44543 715/723 |
| 6,324,338 | B1* | 11/2001 | Wood | G11B 27/005 386/291 |
| 7,751,628 | B1* | 7/2010 | Reisman | G11B 27/034 382/232 |
| 7,779,445 | B2* | 8/2010 | Ellis | H04N 5/44543 725/93 |
| 7,971,222 | B2* | 6/2011 | Ellis | H04N 5/44543 725/91 |
| 2001/0038744 | A1* | 11/2001 | Yamada | H04H 60/17 386/257 |
| 2003/0028761 | A1* | 2/2003 | Platt | G06F 11/1417 713/150 |
| 2003/0093790 | A1* | 5/2003 | Logan | G06F 17/30265 725/38 |
| 2003/0118323 | A1* | 6/2003 | Ismail | H04N 5/44543 386/261 |
| 2003/0121040 | A1* | 6/2003 | Ferman | H04L 12/2805 725/40 |
| 2003/0237090 | A1* | 12/2003 | Boston | H04N 5/76 725/37 |

OTHER PUBLICATIONS

*Rovi Guides, Inc.*, v. *Comcast Corporation et al.* in the U.S. District Court for the Central District of California under Case No. 2:18-cv-00253, Pending, U.S. Pat. No. 9,369,741.

*Rovi Guides, Inc.*, v. *Comcast Corporation et al.* in the U.S. District Court for the Central District of California under Case No. 2:18-cv-00253; Complaint for Patent Infringement, dated Jan. 10, 2018, 584 pages.

* cited by examiner

INTERACTIVE TELEVISION SYSTEMS WITH DIGITAL VIDEO RECORDING AND ADJUSTABLE REMINDERS

CROSS REFERENCE TO RELATED APPLICATIONS

This application is a continuation of U.S. application Ser. No. 15/403,321, filed Jan. 11, 2017, currently allowed, which is a continuation of U.S. application Ser. No. 15/154, 109, filed May 13, 2016, now U.S. Pat. No. 9,591,373, which is a continuation of U.S. application Ser. No. 14/741, 034, filed Jun. 16, 2015, now U.S. Pat. No. 9,369,741, which is a continuation of U.S. application Ser. No. 14/313,348, filed Jun. 24, 2014, now U.S. Pat. No. 9,071,872, which is a continuation of U.S. application Ser. No. 13/866,247, filed Apr. 19, 2013, now U.S. Pat. No. 8,806,546, which is a continuation of U.S. application Ser. No. 13/112,078, filed May 20, 2011, now U.S. Pat. No. 8,799,971, which is a continuation of U.S. patent application Ser. No. 12/827,046, filed Jun. 30, 2010, now U.S. Pat. No. 7,971,222, which is a continuation of U.S. patent application Ser. No. 12/350, 393, filed Jan. 8, 2009, now U.S. Pat. No. 7,779,445, which is a continuation of U.S. patent application Ser. No. 10/357, 001, filed Jan. 30, 2003, now U.S. Pat. No. 7,493,646, all of which are incorporated by reference herein in their entireties.

BACKGROUND OF THE INVENTION

This invention relates to television systems, and more particularly, to interactive television systems such as interactive television program guide systems with network-based or local personal video recorder capabilities and the ability to use such capabilities to reschedule program reminders.

Interactive television systems may be used to provide interactive television program guides in which screens of interactive television program listings are presented to users. Pay-per-view and video-on-demand services, web browsing services, games, home shopping, and other interactive features may be provided using interactive television systems.

In typical interactive television systems, users have set-top boxes or other equipment in their home with which the users interact using remote controls or other user interfaces. In a computer environment, users can access interactive television program guide web sites.

Interactive television program guides may be implemented on personal video recorder platforms. A typical personal video recorder has a hard disk drive for storing digital video recordings that may be played back on a user's television. Video recorder functionality may also be provided using equipment at a cable system headend. With this type of network-based video recorder, a user may direct equipment at the headend to perform video recording and playback functions.

It would be desirable to be able to use the video recording capabilities of an interactive television system to allow a user to reschedule program viewing and program reminders.

It would also be desirable to be able to collect and use information on the desirability of retaining access to certain television programming when managing the storage of network-based or local personal video-recorder content in an interactive television system.

SUMMARY OF THE INVENTION

In accordance with the present invention, interactive television systems are provided that support network-based or local personal video recorder functions. A user may use an interactive television program guide or other interactive television application to schedule a recording of an upcoming broadcast television program. Broadcast television programming may be recorded on network equipment (e.g., a server at a cable system headend or other network location) or on local equipment (e.g., a local personal video recorder). The user may use the network-based or local personal video recorder functions of the system to request that certain recorded programs be played back for the user on the user's equipment.

If desired, programming may be recorded automatically by the network or by the local personal video recorder. Individual copies of programs may be stored for each user as "real" or "actual" copies, or one or more shared copies of programs may be centrally stored and provided to users in the form of "virtual" copies. "Real" copies may also be stored on a local personal video recorder or other suitable local equipment.

Each user may be provided with a personal area that reflects that user's collection of recorded or archived programming. In environments in which copies are centrally maintained, each user's personal area may include a list of that user's virtual recordings or program copies. In environments in which individual network-based or local copies of recorded programs are made for each user, each user's personal area may include real recordings or program copies.

A user may use the interactive television application to set reminders for programs of interest. For example, the user may set a reminder for a program that is scheduled to be broadcast later in the week. Just before the scheduled broadcast time of the program, the user may be presented with a reminder that alerts the user that the desired programming is about to be broadcast.

The network-based or local personal video recorder capabilities of the system may be used to make a program available to the user at times other than the scheduled broadcast time for that program. If a program for which a user is interested in setting a reminder is available from the network at time other than the scheduled broadcast time through the use of such capabilities, the user may be provided with an opportunity to select a viewing time and a time for receiving an accompanying reminder message that is later than the original broadcast time. For example, the user may be provided with on-screen options that allow the user to select a reminder time for the desired program even if there is no scheduled broadcast of the program at that time. The user may also be provided with options that, if selected, direct the system to retain a copy of a program in the user's personal area in the event that the user misses the program.

To use network or local storage efficiently, programs that are of less interest or that are particularly time-sensitive (e.g., nightly news reports) may be maintained on the network-based or local personal video recorder for less time than programs that are of more interest or are less time-sensitive (e.g., a popular situation comedy). This allows less desirable programming to be deleted, thereby freeing up storage space for other uses.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
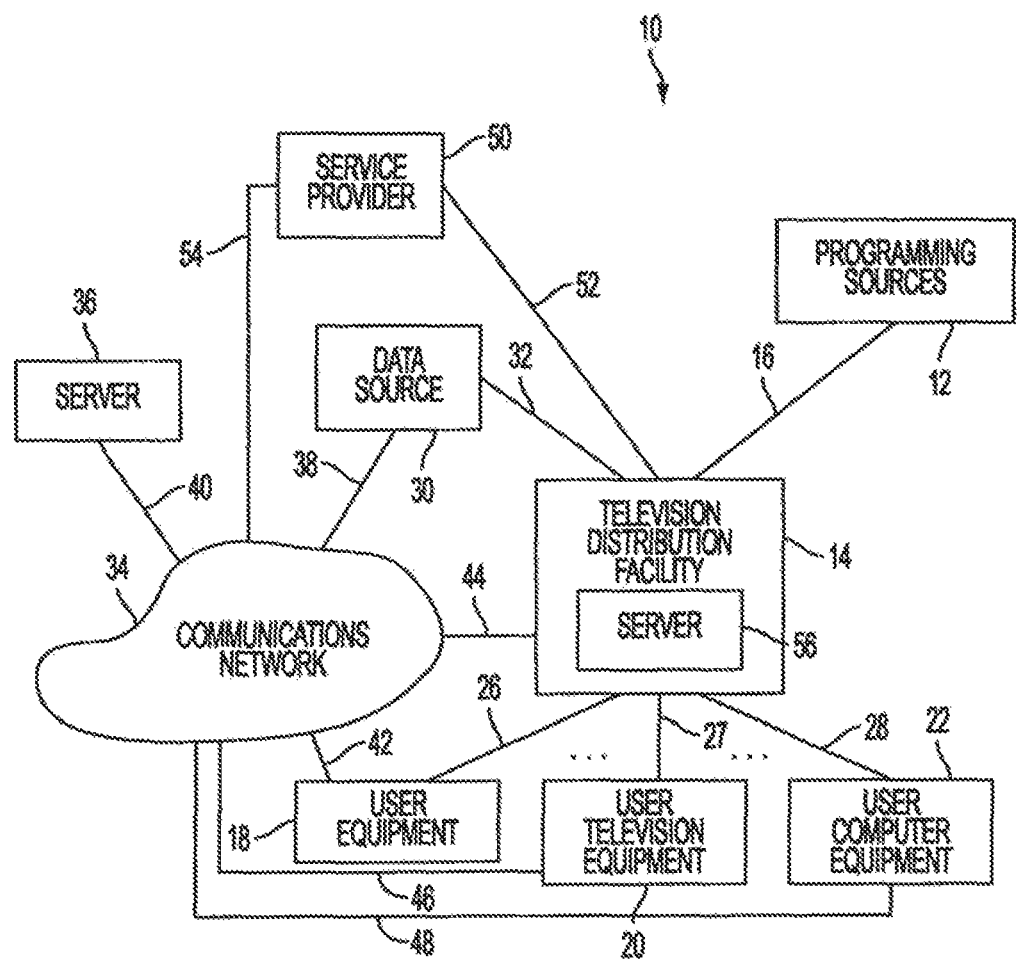
FIG. 1 is a diagram of an illustrative interactive television system in accordance with the present invention.

An illustrative interactive television system 10 in accordance with the present invention is shown in FIG. 1. Content such as television programming and digital music may be provided from programming sources 12 to television distribution facilities such as television distribution facility 14 using communications path 16. Programming sources 12 may be any suitable sources of television and music programming, such as television and music production studios, etc.

Television distribution facility 14 may be a cable system headend, a satellite television distribution facility, a television broadcast facility, or any other suitable facility for distributing television and music programming to users. There are typically numerous television distribution facilities 14 in system 10, but only one is shown in FIG. 1 to avoid overcomplicating the drawings.

Communications path 16 may be a satellite path, a fiber-optic path, a cable path, or any other suitable wired or wireless communications paths or a combination of such paths.

Television distribution facility 14 may be connected to various user equipment devices 18. Such user equipment 18 may, for example, be located in the homes of users. User equipment 18 may include user television equipment 20 or user computer equipment 22.

The user equipment may receive television and music programming and other information from television distribution facility 14 over communications paths such as communications paths 26, 27, and 28. The user equipment may also transmit signals to television distribution facility 14 over paths 26, 27, and 28. Paths 26, 27, and 28 may be cables or other wired connections, free-space connections (e.g., for broadcast or other wireless signals), satellite links, etc.

Data source 30 may include a program listings database that is used to provide the user with television program schedule information such as scheduled broadcast times, titles, channels, ratings information (e.g., parental ratings and critic's ratings), detailed title descriptions, genre or category information (e.g., sports, news, movies, etc.), information on actors and actresses, running times, etc. Data source 30 may also be used to provide advertisements (e.g., program guide advertisements and advertisements for other interactive television applications), real-time data such as sports scores, stock quotes, news, weather, etc. Although data source 30 is drawn as an individual box in FIG. 1, data source 30 and the other system components of FIG. 1 may be provided using equipment at one or more locations. Systems components are drawn as single boxes in FIG. 1 to avoid over-complicating the drawings.

Data source 30 may provide program schedule information and other data to television distribution facility 14 over communications path 32 for distribution to the associated user equipment over paths 26, 27, and 28. Communications path 32 may be any suitable communications path such as a satellite communications path or other wireless path, a fiber-optic or other wired communications path, a path that supports Internet communications, a combination of such paths, etc. Data source 30 may provide program schedule information and other data to the user at user equipment 18 over path 38, communications network 34, and path 42. Path 42 may be a wired path such as a telephone line, a cable path, a fiber-optic path, a satellite path, a wireless path, a combination of such paths, or any other suitable path.

User equipment devices such as user television equipment and personal computers may use the program schedule information to display program listings and information on digital music for the user. An interactive television program guide application or other suitable application may be used to display such information on the user's display.

An on-line program guide and other interactive television services may be provided using a server connected to communications network 34 such as server 36. Server 36 may receive program schedule information and other data from data source 30 via communications path 38, communications network 34, and communications path 40. Paths 38 and 40 may be satellite paths, fiber-optic paths, wired paths, etc. Communications network 34 may be any suitable communications network, such as the Internet, the public switched telephone network, a packet-based network, etc.

User equipment 18 may access on-line program guide information and other information from server 36 via communications path 42. User equipment 18 may also access the on-line program guide and other services on server 36 via communications path 26, television distribution facility 14, and communications path 44. For example, a cable modem or other suitable equipment may be used by user equipment 18 to communicate with television distribution facility 14. Television distribution facility 14 may communicate with communications network 34 over any suitable path 44, such as a wired path, a cable path, a fiber-optic path, a satellite path, a wireless path, a combination of such paths, etc.

User equipment such as user television equipment 20 and user computer equipment 22 may access the on-line program guide and server 36 using similar arrangements. User television equipment 20 may access the on-line program guide and server 36 using communications path 46 or using path 27, television distribution facility 14, and path 44. User computer equipment 22 may access the on-line program guide and server 36 using communications path 48 or using path 28, television distribution facility 14, and path 44. Paths 46 and 48 may be any suitable paths, such as wired paths, cable paths, fiber-optic paths, satellite paths, wireless paths, a combination of such paths, etc.

Program guide application functions and the functions of other interactive television applications may be supported using server 36 and other servers connected to communications network 34 such as server 56. Interactive television applications may also be supported by servers or other suitable equipment at one or more service providers such as service provider 50. For example, a home shopping service may be supported by a service provider such as service provider 50 that has sales representatives, order fulfillment facilities, account maintenance facilities, and other equipment for supporting interactive home shopping features. A home shopping application that is implemented using the user equipment may be used to access the service provider to provide these features to the user. The user equipment may access service provider 50 via television distribution facility 14 and communications path 52 or via communications network 34 and communications path 54. Communications paths such as paths 52 and 54 may be any suitable paths, such as wired paths, cable paths, fiber-optic paths, satellite paths, wireless paths, a combination of such paths, etc.

Another example of an interactive television application is a home banking application. A home banking service may be supported using personnel at facilities such as service provider 50. An interactive home banking application that is implemented using the user equipment may access the home banking service via television distribution facility 14 and communications path 52 or via communications network 34 and communications path 54.

If desired, an interactive television application such as a network-based video recorder or a video-on-demand application may be supported using server 56, server 36, or equipment at service provider 50. Video-on-demand content and video recorded using a network-based video recorder arrangement may be stored on server 56 or server 36 or at service provider 50 and may be provided to the user equipment when requested by users. An interactive television application may be used to support the functions of a personal video recorder (sometimes called a digital video recorder) that is implemented using user equipment 18.

Illustrative equipment that may be used to support personal video recorder functions include specialized personal video recorder devices, integrated receiver decoders (IRDs), set-top boxes with integrated or external hard drives, or personal computers with video recording capabilities.

If desired, applications such as the interactive television program guide application, a home shopping application, a home banking application, a video-on-demand application, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping, network-based video recorder functions, personal video recorder functions, navigational functions, program guide functions, communications functions, and other suitable functions may be provided using one application or any other suitable number of applications.

Moreover, the interactive television program guide application, the home banking application, the home shopping application, the network-based video recorder and personal video recorder applications, the video-on-demand application, the gaming applications, communications applications, and navigational applications, are only a few illustrative examples of the types of interactive television applications that may be supported by system 10. Other suitable applications that may be supported include, news services, web browsing and other Internet services, and interactive wagering services (e.g., for wagering on horse races and the like).

The interactive television application or applications that are used in interactive television system 10 may be implemented locally on the user equipment. The applications may also be implemented in a distributed fashion (e.g., using a client-server architecture in which the user equipment serves at least partly and for at least some of the time, as the client and a server such as server 56 at television distribution facility 14, server 36, or other suitable equipment acts as the server. Other distributed architectures may also be used if desired. Moreover, some or all of the interactive television system features of system 10 may be provided using operating system software or middleware software. Such operating system software and middleware may be used instead of or in combination with application-level software. Regardless of the particular arrangement used to implement interactive television features related to program guides, home shopping, home banking, video-on-demand, Internet, communications, etc., the software that supports these features may be referred to as an application or applications.

Figure 2:
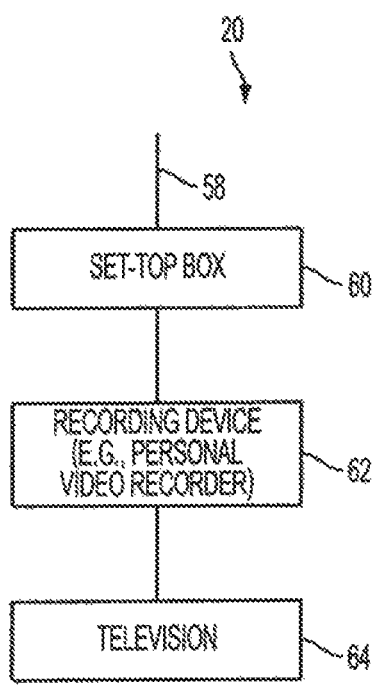
FIG. 2 is a diagram of illustrative user television equipment in accordance with the present invention.

Illustrative user television equipment 20 that is based on a set-top box arrangement is shown in FIG. 2. Input/output 58 may be connected to communications paths such as paths 27 and 46. Input/output functions may be provided by one or more wires or communications paths, but are shown as a single path in FIG. 2 to avoid overcomplicating the drawing. Television programming and other information may be received using input/output 58. Commands and requests and other information from the user may also be transmitted over input/output 58.

Set-top box 60 may be any suitable analog or digital set-top box (e.g., a cable set-top box). Set-top box 60 may contain an analog tuner for tuning to a desired analog television channel. Set-top box 60 may also contain digital decoding circuitry for receiving digital television and music channels. Both analog and digital channels may be handled together if desired. Multiple tuners may be provided (e.g., to handle simultaneous watch and record functions). Box 60 may be an integrated receiver decoder (IRD) that handles satellite television. If desired, box 60 may have circuitry for handling cable, over-the-air broadcast, and satellite content. Box 60 may include a storage device (e.g., a digital storage device such as a hard disk drive) for providing recording capabilities. Box 60 may also be connected to a recording device 62 such as a video cassette recorder, personal video recorder, or other device or devices with storage capabilities.

Set-top box 60 contains a processor (e.g., a microcontroller or microprocessor or the like) that is used to execute software applications. Set-top box 60 may contain memory such as random-access memory for use when executing applications. Nonvolatile memory may also be used (e.g., to launch a boot-up routine and other instructions). Hard disk storage in box 60 or in recording device 62 may be used to back up data and to otherwise support larger databases and storage requirements than may be supported using random-access memory approaches.

Set-top box 60 may have infrared (IR) or other communications circuitry for communicating with a remote control or wireless keyboard. Set-top box 60 may also have dedicated buttons and a front-panel display. The front-panel display may, for example, be used to display the current channel to which the set-top box is tuned.

Set-top box 60 may also have communications circuitry such as a cable modem, an integrated services digital network (ISDN) modem, a digital subscriber line (DSL) modem, a telephone modem, a wireless modem, etc. for communications with other equipment. Such communications may involve the Internet or any other suitable communications networks or paths. If desired, the components of set-top box 60 may be integrated into other user equipment (e.g., a television or videocassette recorder).

Recording device 62 may be used to record videos provided by set-top box 60. For example, if set-top box 60 is tuned to a given television channel, the video signal for that television channel may be passed to recording device 62 for recording on a videocassette, compact disc, digital video disk, or internal hard drive or other storage device. Recording device 62 may have communications circuitry such as a cable modem, an ISDN modem, a DSL modem, a telephone modem, etc. for communications with other equipment. Such communications may involve the Internet or any other suitable communications networks or paths. The components of recording device 62 may be integrated into other user equipment (e.g., a television, stereo equipment, etc.).

Recording device 62 may be controlled using a remote control or other suitable user interface. If desired, video recorder functions such as start, stop, record, etc. and other functions for device 62 may be controlled by set-top box 60. For example, set-top box 60 may control recording device 62 using infrared commands directed toward the remote control inputs of recording device 62 or set-top box 60 may control recording device 62 using other wired or wireless communications paths between box 60 and device 62.

The output of recording device 62 may be provided to television 64 for display to the user. If desired, multiple recording devices 62 or no recording device 62 may be used. If recording device 62 is not present or is not being actively used, the video signals from set-top box 60 may be provided directly to television 64. Any suitable television or monitor may be used to display the video. In the equipment of FIG. 2 and the other equipment of system 10, the audio associated with various video items is typically distributed with those video items and is generally played back to the user as the videos are played.

Figure 3:
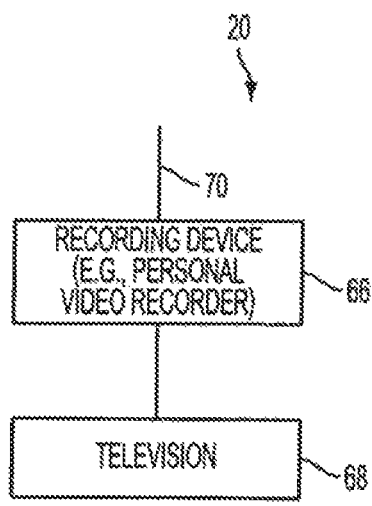
FIG. 3 is a diagram of additional illustrative user television equipment in accordance with the present invention.

Another illustrative arrangement for user television equipment 20 is shown in FIG. 3. In the example of FIG. 3, user television equipment 20 includes a recording device 66 such as a digital video recorder (e.g., a personal video recorder (PVR)) that uses a hard disk or other storage for recording video or may be a digital video disc recorder, compact disc recorder, videocassette recorder, or other suitable recording device. Equipment 20 of FIG. 3 may also include a television 68. Input/output 70 may be connected to communications paths such as paths 27 and 46. Television programming and other information may be received using input/output 70. Commands and requests and other information from the user may be transmitted over input/output 70.

Recording device 66 may contain at least one analog tuner for tuning to a desired analog television channel. Recording device 66 may also contain digital decoding circuitry for receiving digital television and music channels. If desired, recording device 66 may contain circuitry for handling both analog and digital channels. Recording device 66 also contains a processor (e.g., multiple tuners may be provided, a microcontroller or microprocessor or the like) that is used to execute software applications. Recording device 66 may contain memory such as random-access memory for use when executing applications. Nonvolatile memory may also be used to store a boot-up routine or other instructions. The hard disk and other storage in recording device 66 may be used to support databases (e.g., program guide databases or interactive television application databases). The hard disk or other storage in recording device 66 may also be used to record video such as television programs or video-on-demand content or other content provided to recording device 66 over input/output 70.

Recording device 66 may have IR communications circuitry or other suitable communications circuitry for communicating with a remote control. Recording device 66 may also have dedicated buttons and a front-panel display. The front-panel display may, for example, be used to display the current channel to which the recording device is tuned.

Recording device 66 may also have communications circuitry such as a cable modem, an ISDN modem, a DSL modem, a telephone modem, a wireless modem, etc. for communications with other equipment. Such communications may involve the Internet or other suitable communications networks or paths.

If desired, recording device 66 may include a satellite receiver or other equipment that has wireless communications circuitry for receiving satellite signals.

Recording device 66 of FIG. 3 or recording device 62 of FIG. 2 may record new video while previously recorded video is being played back on television 68 or 64. This allows users to press a pause button during normal television viewing. When the pause button is pressed, the current television program is stored on the hard disk of digital video recorder 66. When the user presses play, the recorded video may be played back. This arrangement allows the user to seamlessly pause and resume television viewing. Recording device 66 and 62 may also be used to allow a user to watch a previously-recorded program while simultaneously recording a new program.

The set-top box arrangement of FIG. 2 and the digital video recorder set-top box arrangement of FIG. 3 are merely illustrative. Other arrangements may be used if desired. For example, user television equipment may be based on a WebTV box, a personal computer television (PC/TV), or any other suitable television equipment arrangement. If desired, the functions of components such as set-top box 60, digital video recorder 66, a WebTV box, or PC/TV or the like may be integrated into a television or personal computer or other suitable device.

Figure 4:
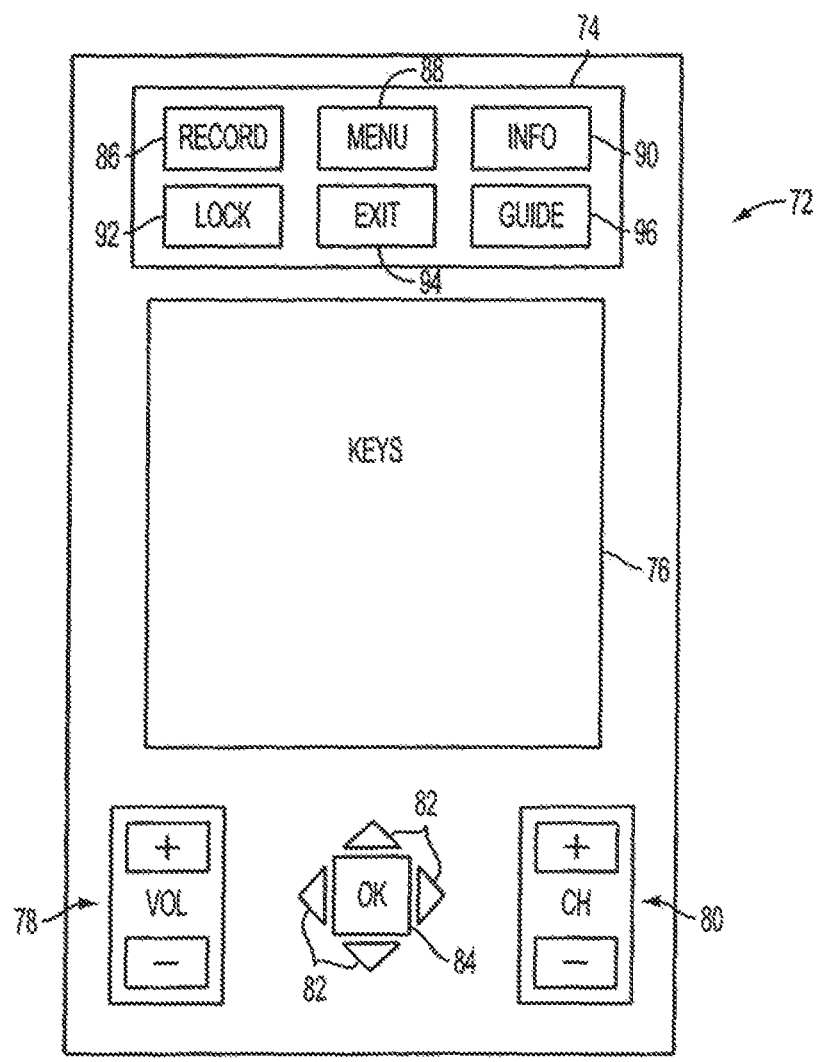
FIG. 4 is a diagram of an illustrative remote control in accordance with the present invention.

An illustrative remote control 72 for operating user television equipment 20 (or suitable user computer equipment 22) is shown in FIG. 4. Remote control 72 may have function keys 74 and other keys 76 such as keypad keys, power on/off keys, pause, stop, fast-forward and reverse keys, etc. Volume up and down keys 78 may be used for adjusting the volume of the audio portion of a video. Channel up and down keys 80 may be used to change television channels and to access content on virtual channels. Cursor keys 82 may be used to navigate on-screen menus. For example, cursor keys 82 may be used to position an on-screen cursor, indicator, or highlight (sometimes all generically referred to herein as a highlight or highlight region) to indicate interest in a particular option or other item on a screen displayed by the interactive television application.

An OK key 84 (sometimes called a select or enter key) may be used to select on-screen options that the user has highlighted.

Keys 74 may include a record key 86 for initiating recordings. Menu button 88 may be used to direct the interactive television application to display a menu on the user's display screen (e.g., on television 64 or 68 or on a suitable monitor or computer display). Info button 90 may be used to direct the interactive television application to display an information display screen. If the user has highlighted a particular program listing, for example, pressing the info button 90 may direct the interactive television application to provide additional program schedule information related to that program listing (e.g., a program summary, actor information, etc.).

Lock button 92 may be used to modify access privileges. For example, a parent may use lock button 92 or on-screen options to establish parental control settings for the interactive television application. The parental control settings may be time-based settings (e.g., to prevent a child from watching television during a particular time block such as from 3:00 PM to 5:00 PM). The parental control settings may also be used to block programming based on rating, channel, program title, etc. A locked or blocked program is typically not viewable until the interactive television application is provided with a suitable personal identification number (PIN). Once this PIN has been entered, the interactive television program will unlock the user's equipment and allow the locked content to be accessed.

Exit button 94 may be used to exit the interactive television application or to exit a portion of the interactive television application. Guide button 96 may be used to invoke the interactive television program guide.

The keys shown in FIG. 4 are merely illustrative. Other keys or buttons may be provided if desired. For example, a music button may be used to access music with the interactive television application. An edit button may be used to edit stored content (e.g., to remove commercials, remove portions of a video, etc.). Alphanumeric buttons may be used to enter alphanumeric characters. A last or back button may be used to browse backward in the interactive television application (e.g., to return to a previous channel or display screen). Video recorder function buttons such as a play button, pause button, stop button, rewind button, fast-forward button, and record button, may be used to control video recorder functions (local or network-based) in system 10. A help key may be used to invoke help functions such as context-sensitive on-screen help, etc.

Figure 5:
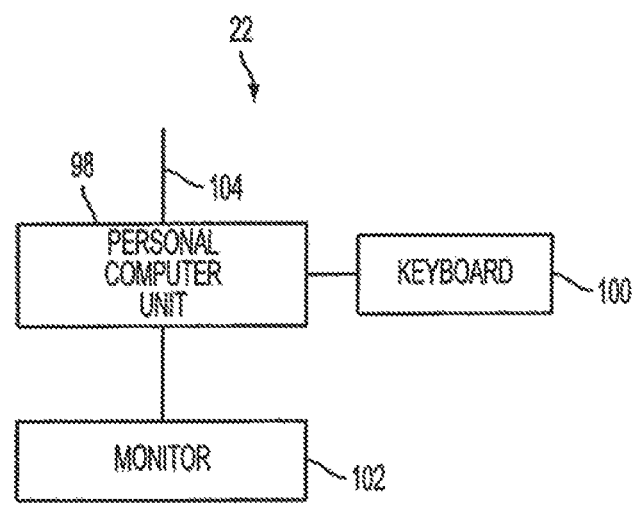
FIG. 5 is a diagram of illustrative user computer equipment in accordance with the present invention.

Illustrative user computer equipment 22 is shown in FIG. 5. In the arrangement of FIG. 5, personal computer 98 may be controlled by the user using keyboard 100 or other suitable user input device, such as a trackball, mouse, touch pad, touch screen, voice recognition system, a remote control such as remote control 72 of FIG. 4, etc. Video content such as television programming and interactive television application display screens may be displayed on monitor 102. Television programming, video-on-demand content, video recordings played back from a network-based video recorder, and other information may be received from paths 28 and 48 (FIG. 1) using input/output 104. The user may also send commands and other information used during interactions with the interactive television application and system 10 over input/output line 104.

Personal computer unit 98 may contain a television or video card such as television tuner card for decoding analog and digital television channels and for handling streaming video content. Multiple video cards (e.g., tuner cards) may be provided if desired. An illustrative television tuner card that may be used may contain an analog television tuner for tuning to a given analog channel and digital decoding circuitry for filtering out a desired digital television or music channel from a packetized digital data stream. Any suitable card or components in computer unit 98 may be used to handle video and other content delivered via input/output line 104 if desired.

Personal computer unit 98 may contain one or more processors (e.g., microprocessors) that are used to run the interactive television application or a portion of the interactive television application.

Storage in personal computer unit 98 such as a hard drive, DVD drive, CD drive, or other suitable storage device or devices may be used to store video and other content. For example, the interactive television application and personal computer unit 98 may use this storage to provide the functions of a personal video recorder.

User equipment 18 such as user television equipment 20 and user computer equipment 22 may be used with network equipment such as server 56, server 36, and equipment at service providers such as service provider 50 of FIG. 1 to provide network-based video recording functions. Video recording functions may be provided by storing copies of television programs and other video content on a remote server (e.g., server 56 or server 36 of FIG. 1) or other network-based equipment such as equipment at a service provider such as service provider 50.

Video recordings may be made in response to user commands that are entered at user equipment 18. In a personal video recorder arrangement, the interactive television application may be used to record video locally on the user equipment in response to the user commands. In a network-based video recorder arrangement, the interactive television application may be used to record video or to make virtual recordings on network equipment such as server 36, 56, or equipment at service provider 50 in response to the user commands. The user commands may be provided to the network equipment over the communications paths shown in FIG. 1. The personal video recorder arrangement and the network-based video recorder arrangement can support functions such as fast-forward, rewind, pause, play, and record.

To avoid unnecessary duplication in a network-based video recorder environment, the system 10 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area.

The user television equipment and user computer equipment arrangements described above are merely illustrative. A more generalized embodiment of illustrative user equipment is shown in FIG. 6.

Figure 6:
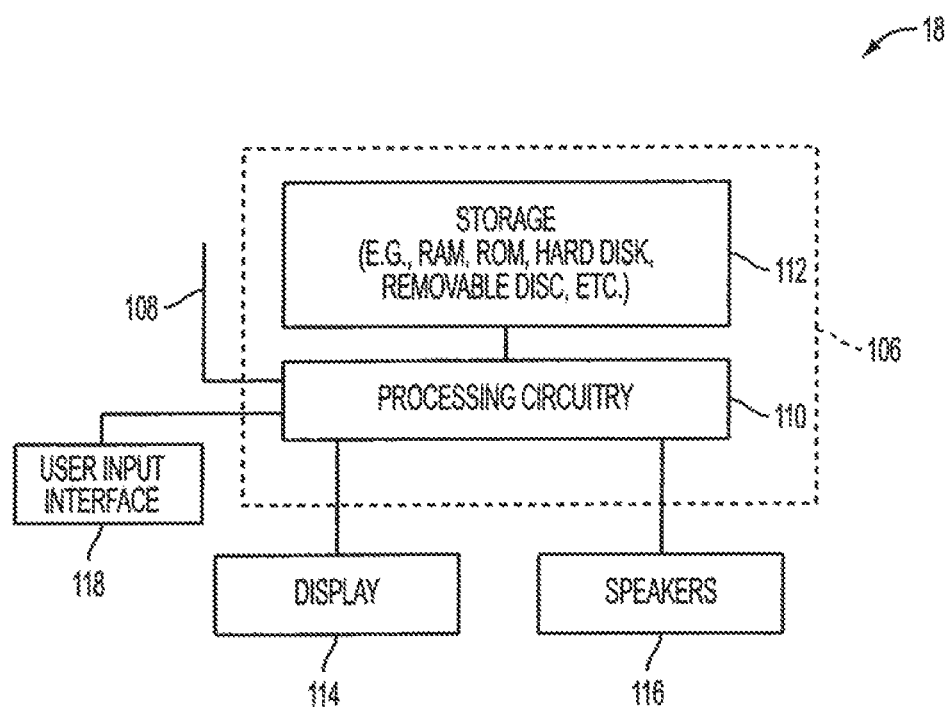
FIG. 6 is a generalized diagram of illustrative user equipment in accordance with the present invention.

As shown in FIG. 6, control circuitry 106 is connected to input/output 108. Input/output 108 may be connected to one or more communications paths such as paths 26, 27, 28, 42, 46, and 48 of FIG. 1. Television and music programming may be received via input/output 108 (e.g., from programming sources 12, servers or other equipment such as server 36, service providers such as service provider 50, and television distribution facility 14). Program schedule information for an interactive television program guide may be received from data source 30 via input/output 108. Input/output 108 may also be used to receive information from data source 30 for other interactive television applications. The user may use control circuitry 106 to send commands, requests, and other suitable information using input/output 108.

Control circuitry 106 may be based on any suitable processing circuitry 110 such as processing circuitry based on one or more microprocessors, microcontrollers, digital signal processors, programmable logic devices, etc. Memory (e.g., random-access memory and read-only memory), hard drives, DVD drives, CD drives, or any other suitable memory or storage devices may be provided as storage 112 that is part of control circuitry 106. Tuning circuitry such as one or more analog tuners, one or more MPEG-2 decoders or other digital video circuitry, or any other suitable tuning or video circuits or combinations of such circuits may also be included as part of circuitry 106. Encoding circuitry (e.g., for converting over-the-air or cable analog signals to MPEG signals for storage) may also be provided. The tuning and encoding circuitry may be used by the user equipment to receive and display or play or record a particular television or music channel or other desired audio and video content (e.g., video-on-demand content or requested network-based or local video recorder playback). Television programming and other video and on-screen options and information may be displayed on display 114. Display 114 may be a monitor, a television, or any other suitable equipment for displaying visual images. Speakers 116 may be provided as part of a television or may be stand-alone units. Digital music and the audio component of videos displayed on display 114 may be played through speakers 116.

A user may control the control circuitry 106 using user input interface 118. The user input interface 118 may be any suitable user interface, such as a mouse, trackball, keypad, keyboard, touch screen, touch pad, voice recognition interface, remote control, etc.

Figure 7:
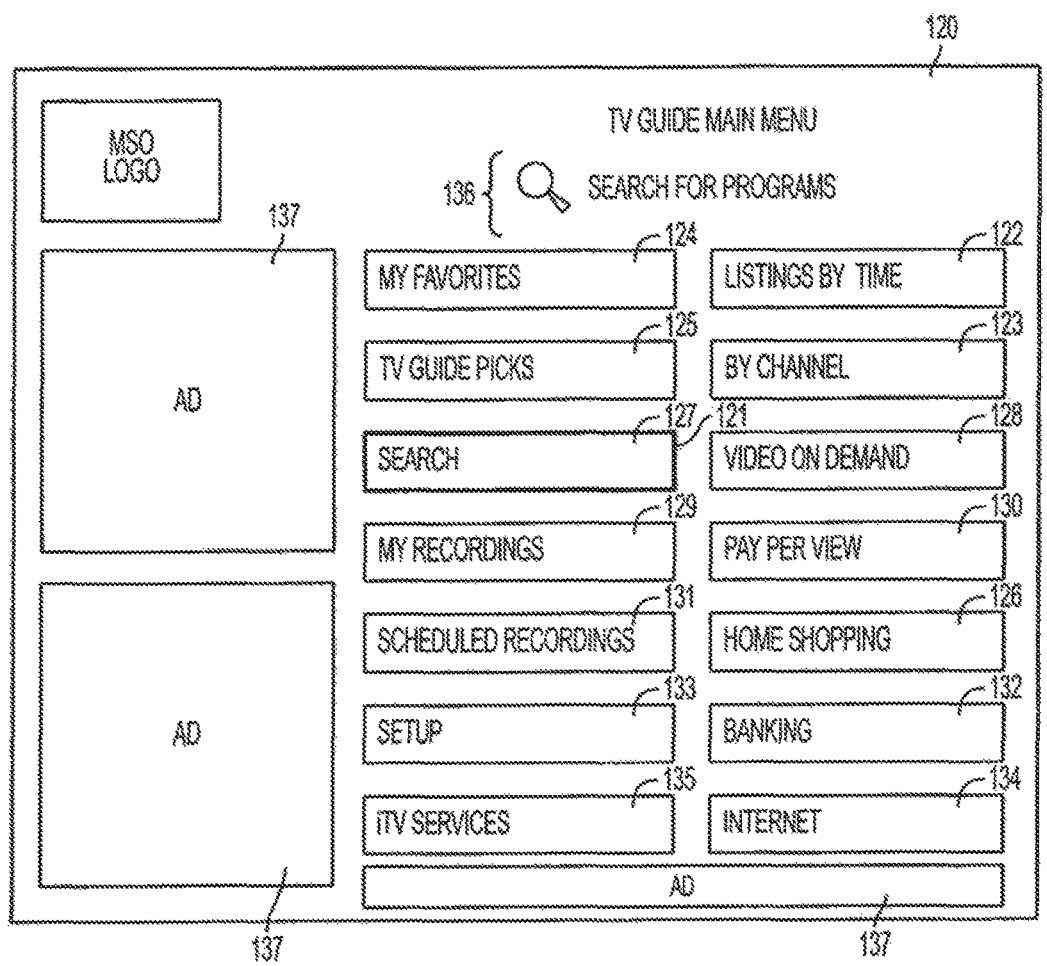
FIG. 7 shows an illustrative menu screen in accordance with the present invention.

An illustrative menu 120 that may be displayed on the user's display screen is shown in FIG. 7. As shown in FIG. 7, menu 120 may provide the user with an number of selectable options. The options shown in FIG. 7 are merely illustrative. Any suitable options may be provided if desired.

A user of user equipment 18 (e.g., a user of user television equipment 20 or a user of user computer equipment 22, or a user of any other suitable user equipment device) may invoke an interactive television menu such as menu screen 120 by pressing menu button 88 (FIG. 4). Remote control 72 (FIG. 4) or other user interface 118 (FIG. 6) may be used to position highlight region 121 on top of selectable options such as options 122-135. If the user selects option 122 or 123, a screen of program listings may be displayed. Option 124 may be used to display program listings for channels designated by the user as "favorites." Option 125 may be used to provide program listings selected for promotion by a service provider (e.g., a program guide service provider, a cable operator, etc.). Option 126 may be used to invoke a home shopping service. Options 127 may be used to search program listings by title, time, category, or any other criteria. Option 128 may be selected to display options related to video-on-demand services. Option 129 may be selected to display an interactive list of previously recorded recordings and option 131 may be selected to display an interactive list of programs scheduled for recording. Option 130 may be selected to display pay-per-view program listings and pay-per-view services options. If the user selects option 132, the user may be presented with an opportunity to access home banking functions. Option 133 may be selected to change system setup options and option 134 may be selected to launch a web browser or other application for accessing the Internet. Option 135 may be selected to access other interactive television services. When the user selects an option with highlight region 121 from menu screen 120, the user's selection may be described in information display region 136.

If desired, program guide screens such as menu screen 120 and other interactive television application screens may include selectable advertisements 137. Any suitable advertisements may be provided, including panel advertisements, banner advertisements, advertisements provided between program listings, advertisements provided on certain program listings or other portions of the screen, or any other suitable advertisements. A user may use cursor keys 82 of remote control 72 (FIG. 4) to position a highlight region on an advertisement of interest and may select the highlighted advertisement using OK key 84. Users of other user interfaces may make appropriate selections using the buttons or controls available through those interfaces (e.g., using voice commands if the user interface involves a voice recognition arrangement, etc.).

Figure 8:
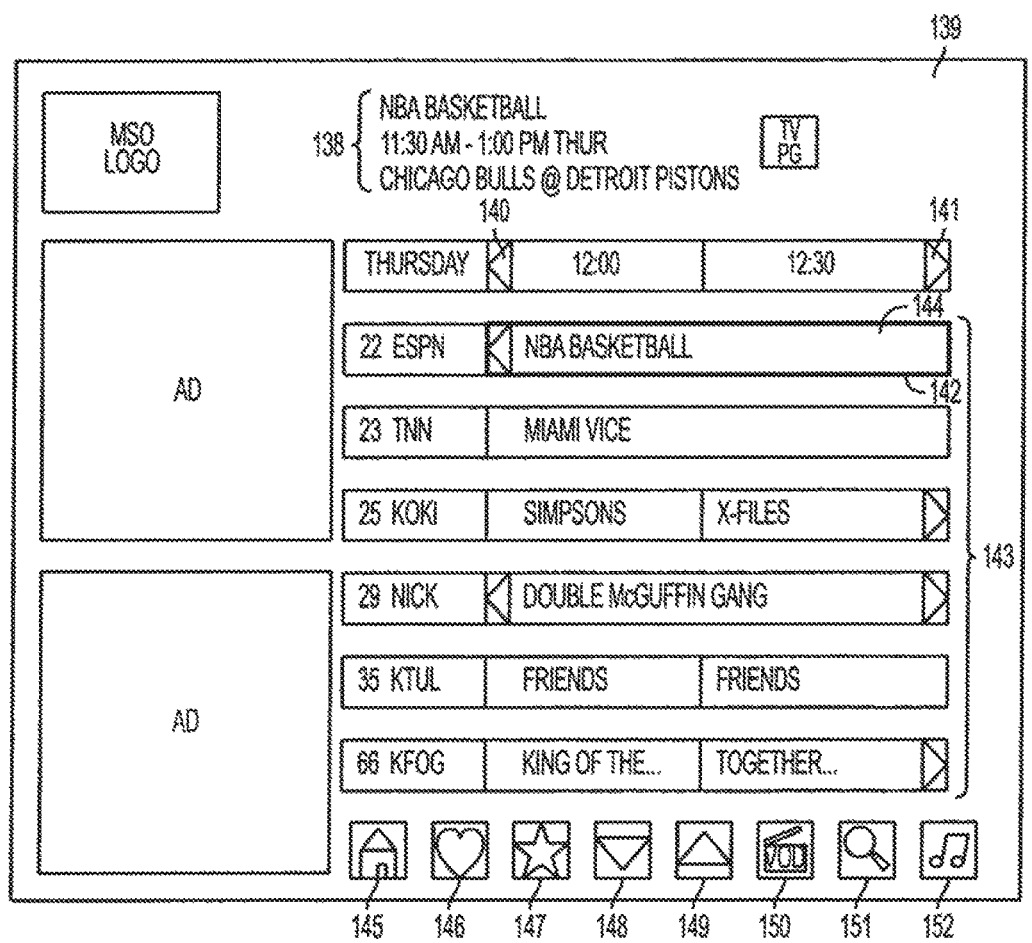
FIG. 8 shows an illustrative program guide screen in accordance with the present invention.

An illustrative program guide screen 138 that may be displayed for the user is shown in FIG. 8. Program guide screen 138 may be displayed, for example, when the user selects program listings option 122 of FIG. 7, when the user selects a suitable option from within an interactive television program guide application or other interactive television application, or when the user presses an appropriate remote control button such as guide button 96 or otherwise uses user input interface 118 to indicate a desire to view program listings.

Program guide screen 138 may contain a grid or list of program listings 143. Program listings 143 may include program titles, channels, scheduled broadcast times, and any other suitable program schedule information. Highlight region 142 may be used to select a desired program listing 144. Program Information for selected programs may appear elsewhere on program guide screen 138 (e.g., in program information display region 139). If the user presses OK key 84 when a program listing for a current program is highlighted, the interactive television application may tune to the channel for that program. If the user presses OK key 84 when a program listing for a future program is highlighted, the interactive television application may provide the user with an opportunity to set a reminder for that program or to record that program.

Other functions that the interactive television application may provide include the ability to set favorites or establish preferences or other settings. For example, the user may select a particular channel for the program guide to automatically tune to when the user equipment is turned on. The user may also select favorite programs, favorite channels, etc. The program guide or other interactive television application may provide the user with the ability to establish parental control settings, the ability to search for programming of interest, and the ability to view program descriptions, advertisements, text, graphics, and video, etc. These are merely illustrative examples of interactive television functions that may be provided by interactive television system 10. Other suitable interactive television functions may be provided if desired.

A user may access program listings (e.g., program listings of the type shown in FIG. 8) by using the interactive television application to select an on-screen option such as option 122 and 123 of FIG. 7, by pressing a dedicated guide button such as guide button 96 on remote control 72, by selecting any other suitable button or on-screen option, etc. In the example of FIG. 8, program listings are currently being displayed for television programs that air between 12:00 noon and 1:00 PM. As shown by arrows 140 and 141, the user may use right or left cursor keys to navigate to other times (e.g., to direct the interactive television application to display appropriate screens of program listings 143 for different time periods). If desired, the user may select options or press keys (or use user input interface 118 to otherwise enter suitable commands) that direct the interactive television application to display program listings organized by channel, by genre, by service type (e.g., pay-per-view or regular broadcast television), etc.

Selectable options, such as options 145, 146, 147, 148, 149, 150, 151, and 152, may be provided as part of program guide screen 138 or any other program guide screen for providing access to various interactive television application features. For example, option 145 may be used to display a home screen or main menu, such as menu screen 120 of FIG. 7. Option 146 may be selected to display program listings for channels designated by the user as "favorites." Option 147 may be selected to display listings of recommended programs using highlight region 142. Scroll indicators 148 and 149 may be used to navigate down and up through program listings. Option 150 may be selected to display information related to video-on-demand services. Option 151 may be selected to search television program listings by title, time, category, or any other suitable criteria. Option 152 may be selected to display information related to digital music services.

Figure 9:
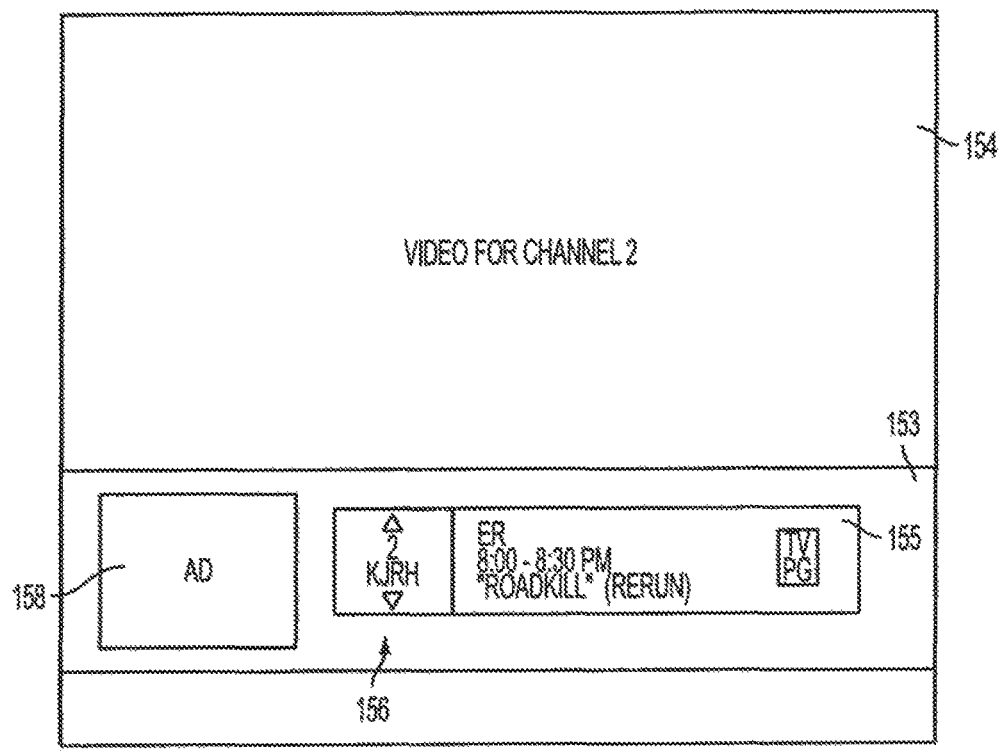
FIG. 9 is an illustrative display screen showing how a flip banner that contains program listings information for the current channel may be displayed as an overlay over video of the current channel in accordance with the present invention.

The interactive television application may provide a "flip" tuning feature. As shown in FIG. 9, when the user invokes the flip mode, flip display 153 may be provided over a portion of a channel (i.e., channel 2) that the user is currently tuned to and is watching on display screen 154. Flip display 153 contains information (in region 156) on the program 155 appearing on the current channel (channel 2) to which the set-top box 60 or other user equipment is tuned. The user may change the channel using channel up and down keys on the remote control or using user interface 118 to issue other suitable channel change commands. This simultaneously changes the channel to which the set-top box 60 or other user equipment is tuned and the channel information displayed in region 156 (and the associated program information 155).

The flip display 153 may be removed manually or automatically (e.g., after a few seconds or other suitable time period of user inactivity). When the user starts changing channels again, the flip display 153 may be displayed again.

The flip feature of the interactive television application therefore allows the user to view program information for the channel that the user is currently viewing as the user changes channels. In the example of FIG. 9, the flip display 153 is displayed in the form of an overlay on top of the current channel. If desired, the video for the current channel may be reduced in size and the flip information (e.g., the program title and channel information for the current program) may be displayed at a location on the periphery of the reduced-size video (e.g., at the bottom, side, or top of the reduced-size video).

An advertisement 158 or other content may be provided in the flip display region if desired. Other optional information that may be displayed in flip display 153 includes information on the scheduled broadcast times for the program 155, ratings information, program descriptions, and other program-related information.

Figure 10:
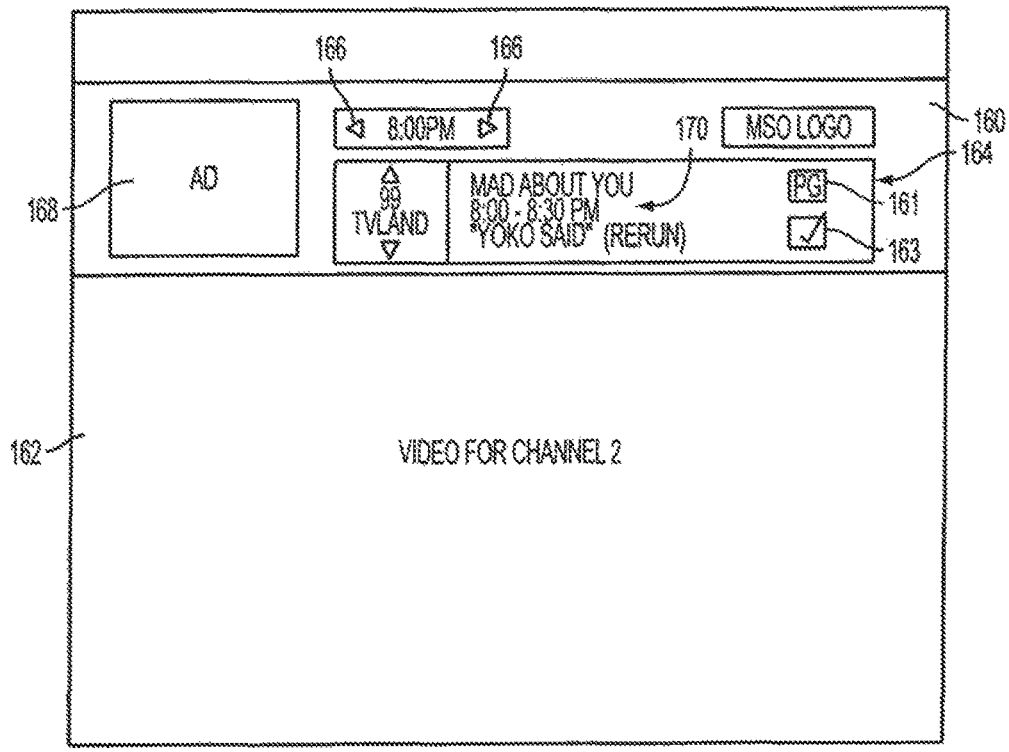
FIG. 10 is an illustrative display screen showing how a browse banner that contains program listings information for a channel that may differ from the current channel may be displayed as an overlay over video of the current channel in accordance with the present invention.

The interactive television application may also be used to provide a browse feature. As shown in FIG. 10, when the user invokes the browse feature (e.g., by pressing an up or down cursor key), browse display 160 may be displayed as an overlay over a portion of the channel (i.e., channel 2) that is being displayed on the user's display screen 162 and to which the user is currently tuned. Browse display 160 may initially contain information on the current channel. For example, browse display 160 may, when initially invoked by the user, contain the title of the current program and information on the current channel such as the current channel number, call letters, and network logo.

When the user presses the up or down cursor key (or enters other suitable commands using user interface 118), the browse display may be changed to display information on the programming available on other channels. In the example of FIG. 10, the user has pressed the cursor keys repeatedly, until the user has browsed to channel 99. The video that is being displayed on display screen 162 has not changed in this example (channel 2 is still being displayed).

As indicated by arrows 166, the user may use right and left cursor keys 82 (or other suitable controls) to browse to other time slots (e.g., to view information related to programming that is scheduled for broadcast at a later time). Browse display 160 may contain an advertisement 168, information 170 on scheduled program times, program descriptions and other program-related information and icons such as check icon 163 (to indicate that a reminder has been set for a given program) and ratings icon 161.

If the user locates a currently available program of interest on another channel, the user may press the OK key 84 to direct the interactive television application to tune the user equipment to that channel.

The browse display 160 may be removed manually or may be removed automatically from display screen 162 after a suitable period of user inactivity (e.g., after a few seconds or a minute or two).

If desired, the browse display can be displayed on the periphery of the video for the current program rather than as an overlay. The video for the current channel may be reduced in size accordingly.

Figure 11:
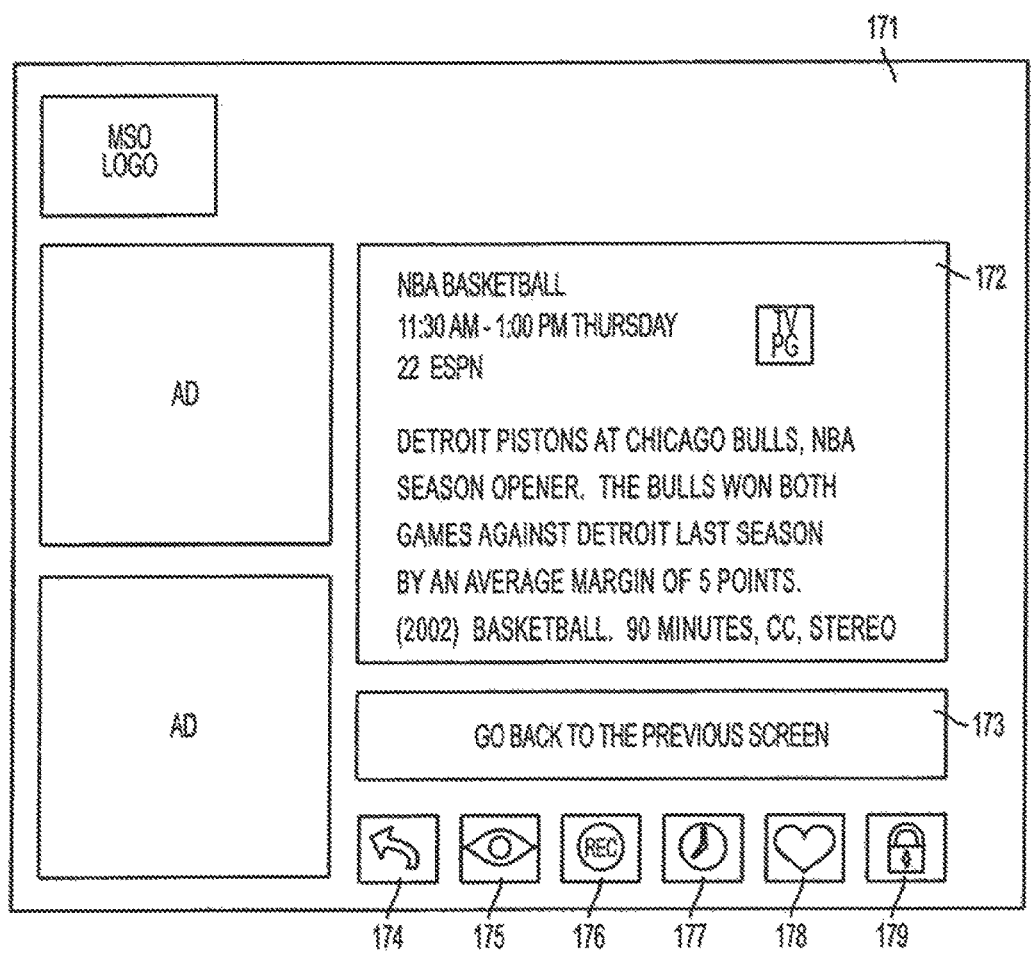
FIG. 11 shows an illustrative program guide screen in accordance with the present invention.
Figure 12:
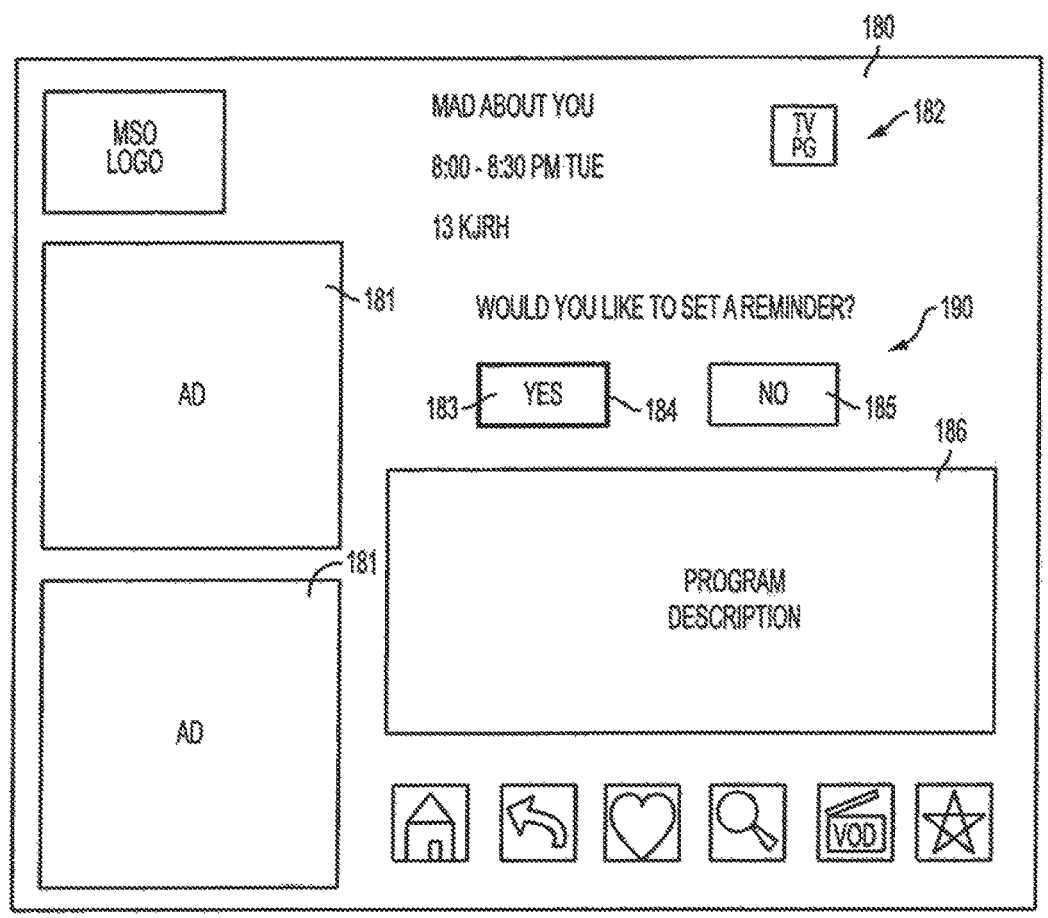
FIG. 12 is an illustrative display screen showing how an interactive television application may provide a user with an opportunity to set a program reminder in accordance with the present invention.

When the user has indicated interest in a program (e.g., by positioning highlight region 142 of FIG. 8 on top of a given program listing, by tuning to a program, by viewing a program listing on the flip banner of FIG. 9 or the browse banner of FIG. 10, etc.), the user may press info key 90 (FIG. 4) to obtain more information for that program. Illustrative info screens 171 and 180 that may be displayed when a user presses info button 90 are shown in FIGS. 11 and 12, respectively. Screens such as screens 171 and 180 may be provided when a user selects a program listing from a interactive television application screen (e.g., program guide screen 138 of FIG. 8). Info screen 171 of FIG. 11 may include a detailed description 172 of a program selected by the user. Description 172 may include, for example, the title, time, channel, and rating of the program, or any other suitable information. As in FIG. 8, selectable options may be provided as part of info screen 171 to provide access to various interactive television application features. For example, option 174 may be used to return to the previous program guide screen. Option 175 may be used to tune to the selected program or set a reminder for the selected program (e.g., the program for which information is displaying in description 172). Option 176 may be selected to display recording options and services for the selected program. Option 177 may be selected to display options for adding a reminder for the selected program. Option 178 may be used to display options for adding the selected program or channel to a user's favorites, and option 179 may be used to display options for providing a parental lock on the selected program. Selectable options for other interactive television application features may also be provided. A highlight region may be used to select any of the selectable options provided by a program guide screen. Information describing a highlighted option may be provided, for example, in information display region 173.

Information screens may include advertisements. For example, info screen 180 of FIG. 12 may include selectable advertisements 181. Information regions on screen 180 such as title region 182 and program description region 186 may be used to display information on the selected program such as title information, ratings information, plot summary information, information about actors, genre, critics ratings, etc.

Region 190 may be used to inform the user of the possibility of setting a reminder for the selected program, of tuning to the channel showing the selected program, of recording the selected program, of purchasing the selected program if it is a pay-per-view program, of parentally controlling the selected program, of configuring a related profile or preference settings, or performing any other suitable action related to the selected program. Region 190 may also be used to provide additional information related to the selected program. The user may position highlight region 184 on top of either yes option 183 or no option 185 or any other suitable options (e.g., options to tune to the channel, to record the program, to purchase the program, to parentally control the program, to configure the preference settings, etc.). When the user presses the OK key 84, the interactive television application may then take appropriate actions. If the user opts to set a reminder for the program listed in the info screen 180, the interactive television application may display a pop-up reminder overlay on top of the video for the channel that the user is currently watching just before the program associated with the reminder is scheduled to begin, or any suitable display screen that is active at the time that the reminder pops up (e.g., a program listings screen).

Figure 13:
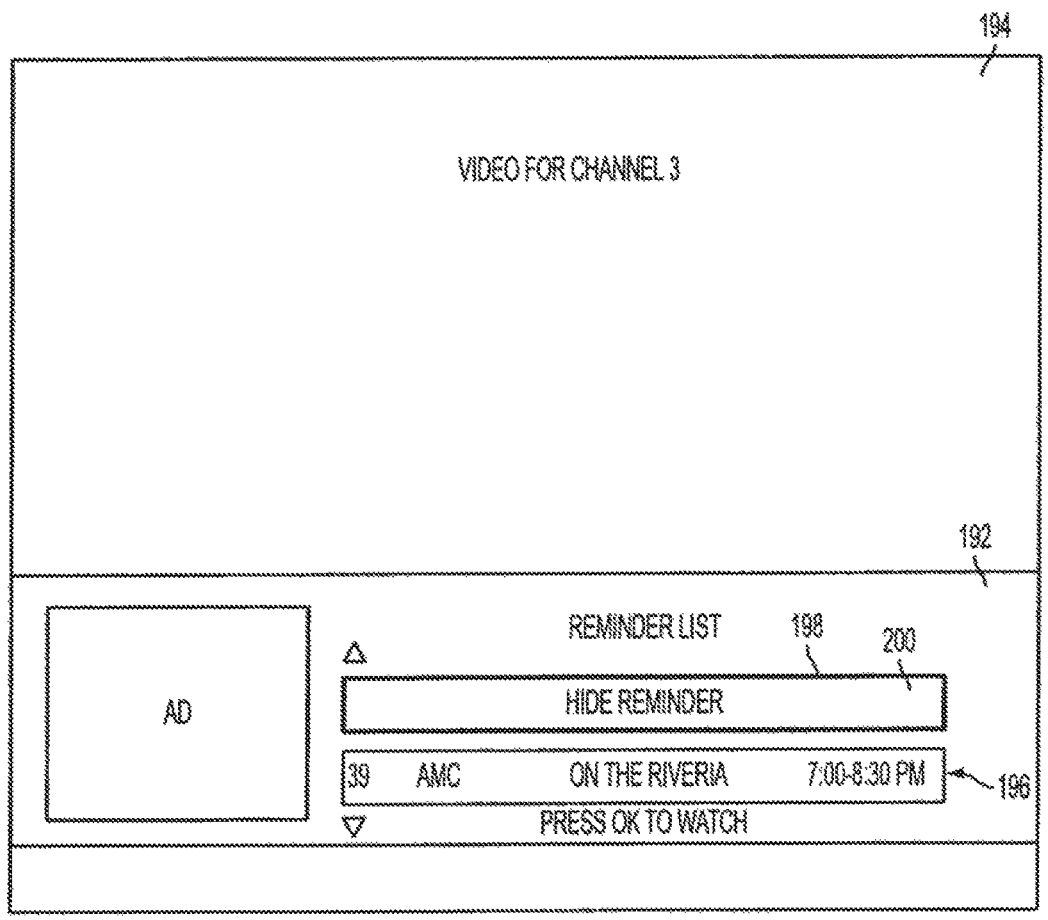
FIG. 13 is an illustrative display screen showing how a reminder may be provided for a user in accordance with the present invention.

An illustrative reminder is shown in FIG. 13. In the example of FIG. 13, the user is watching channel 3. The current time is 6:58 PM. Previously, the user set a reminder for the program "On The Riviera," which is scheduled to be shown on channel 39 at 7:00 PM. Because the program for which the user set the reminder is just about to begin, the interactive television application displays reminder list 192 as an overlay on top of the video for channel 3 that is being presented on display screen 194. The reminder list may contain a list of one or more programs for which the user has set reminders. In the example of FIG. 13, one program listing 196 ("On The Riviera") is displayed.

The user can tune to a program by selecting that program from the reminder list 192. For example, the user may position highlight region 198 on listing 196 and may select that listing by pressing the OK key 84. The interactive television application may then tune the user to the channel for the desired program (i.e., channel 39 in this example).

The user can close the reminder list by pressing the OK key 84 while hide reminder option 200 is highlighted.

The reminder list may be displayed at any suitable time (e.g., at 0-15 minutes before the program of interest is to begin, at a user-selected time before that program, etc.). Moreover, the reminder list may be displayed around the periphery of the video for the current channel and the video for the current channel may be displayed in a reduced-size window. These are merely illustrative examples. Any suitable arrangement may be used to notify the user of upcoming programs or in-progress programs for which the user has set reminders and other programs of interest.

Figure 14:
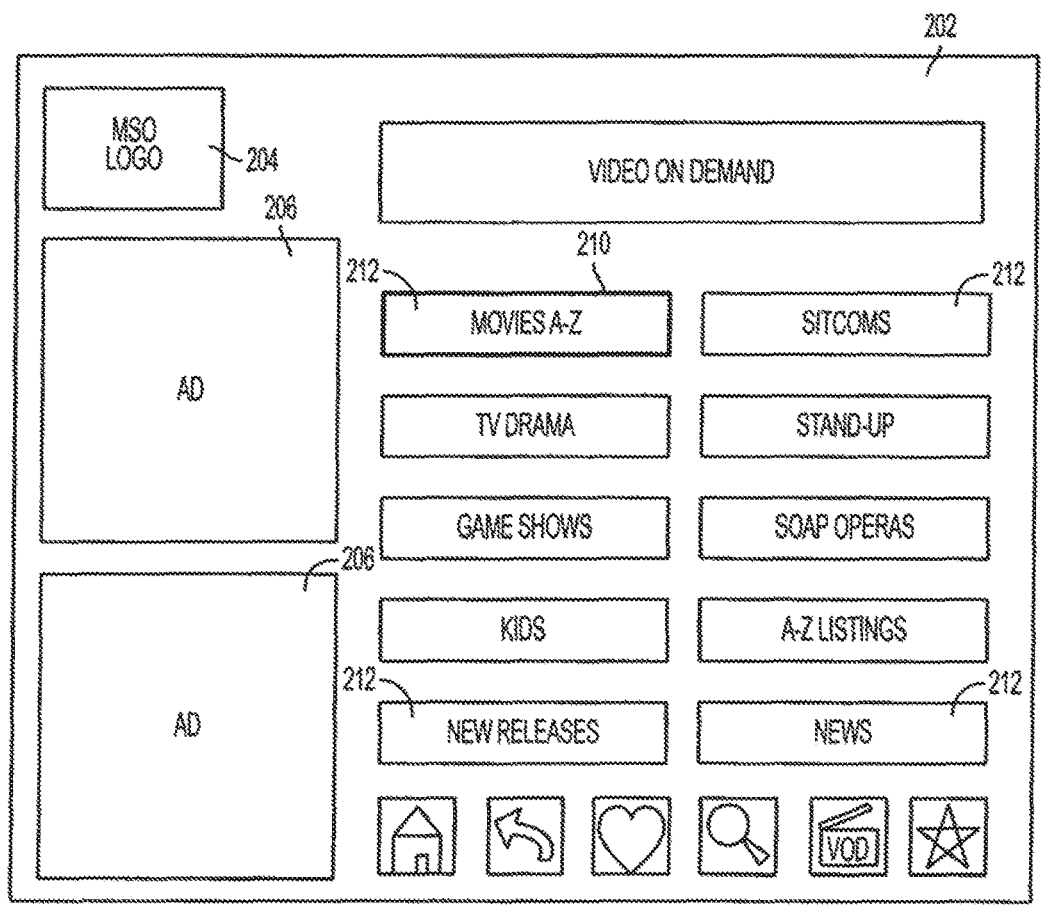
FIG. 14 is a display screen showing an illustrative video-on-demand menu that may be used to select a category of video-on-demand content in accordance with the present invention.

The interactive television application may be used to provide the user with access to video-on-demand content. The user may, for example, be provided with an option such as video-on-demand option 128 on menu screen 120 of FIG. 7. When the user selects option 128, the interactive television application may display a screen such as video-on-demand categories screen 202 of FIG. 14. Screen 202 may include logos such as logo 204, selectable (or non-selectable) advertisements such as advertisements 206, and a screen title 208. The user may position highlight region 210 on an option 212 corresponding to a video-on-demand category of interest.

Figure 15:
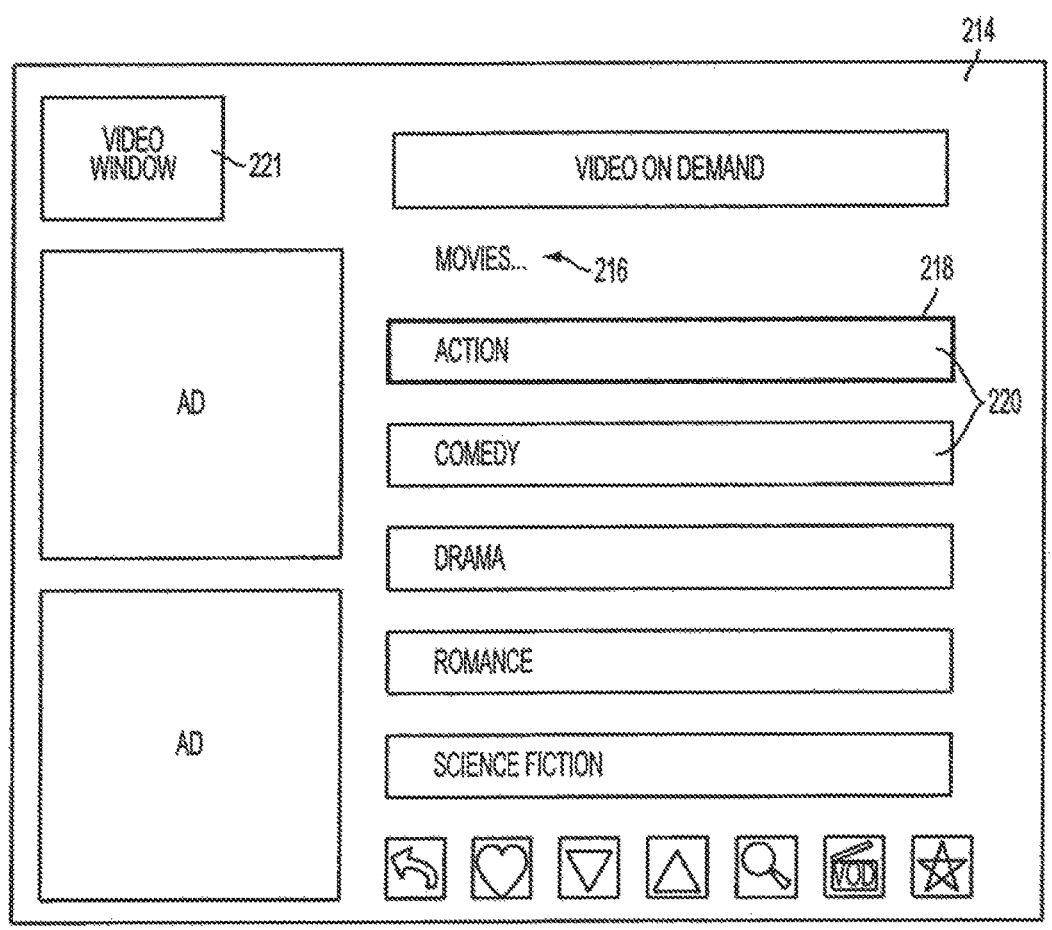
FIG. 15 is a display screen showing an illustrative video-on-demand menu screen that may be used to locate a desired type of movie in accordance with the present invention.

When the user selects the video-on-demand category of interest from screen 202, the interactive television application may display a display screen such as subcategory selection screen 214 of FIG. 15. In the example of FIG. 15, the subcategories screen 214 contains subcategory options 220 corresponding to movies, because (in this example) the user selected movies A-Z option 212 from screen 202 in FIG. 14. Video window 221 may be provided in any video-on-demand information screen and may provide information relating to a video-on-demand program selected by the user or any other suitable video information.

Figure 16:
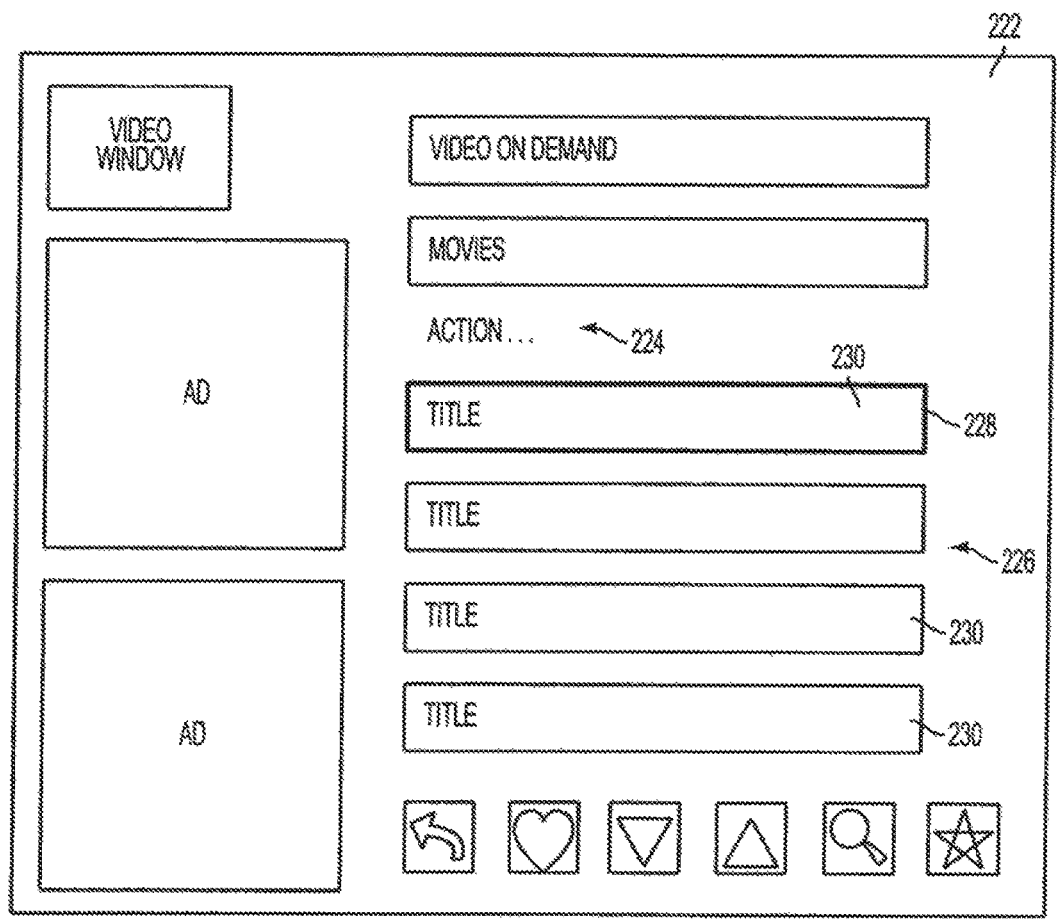
FIG. 16 shows an illustrative title menu that may be used to select a video-on-demand title of interest in accordance with the present invention.

The user may position highlight region 218 onto a desired subcategory 220 and may press OK key 84 to view a list of available video-on-demand content associated with that subcategory. An illustrative display screen 222 that the interactive television application may display for the user when the action subcategory option 220 (FIG. 15) is selected is shown in FIG. 16. As shown in FIG. 16, display screen 222 may include information identifying the selected subcategory 224. Screen 222 may also include a list 226 of titles 230 (or other content indicators). The user may position highlight region 228 on a desired video-on-demand title 230 and may press the OK key to proceed with the selection of that title.

Figure 17A:
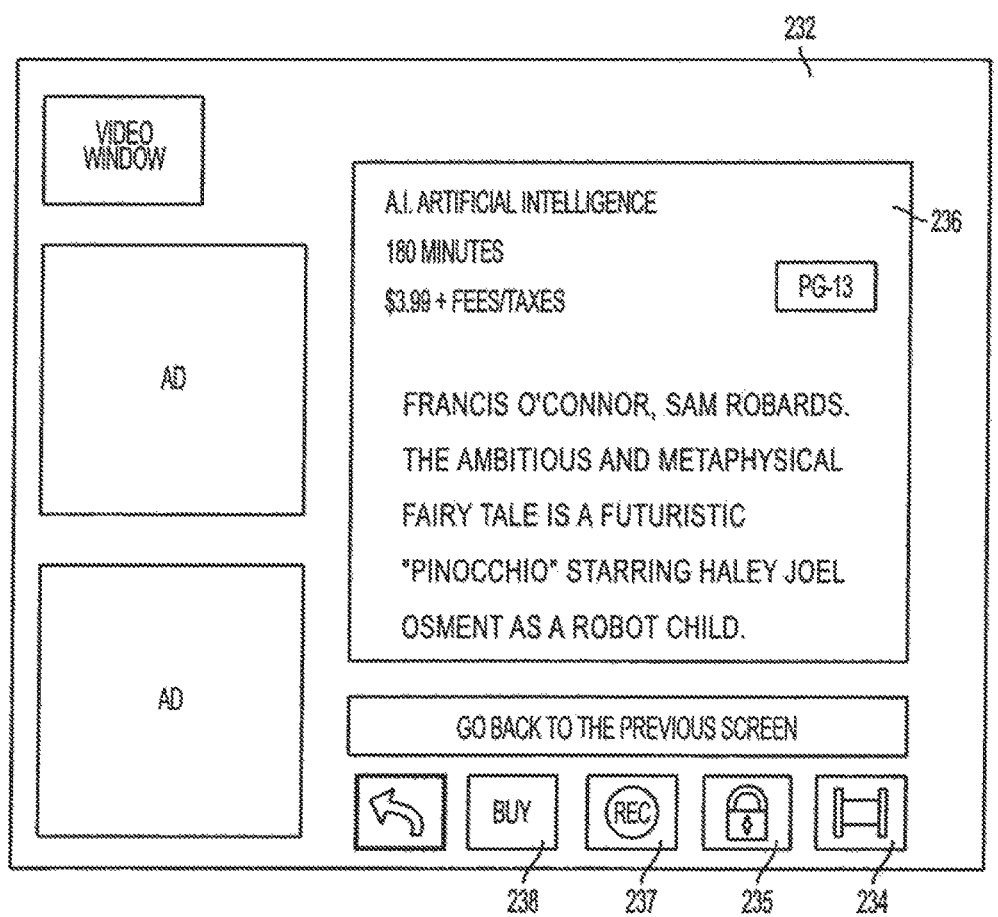
FIGS. 17a and 17b are illustrative video-on-demand information screens that may be used to access video-on-demand content in accordance with the present invention.

Selecting a desired video-on-demand title 230 from title selection screen 222 may direct the interactive television application to display a video-on-demand information screen such as information screen 232 of FIG. 17a. Screen 232 may include information 236 on the selected video-on-demand content, such as title, run time, price, rating, and a description of the selected video-on-demand content.

Selectable options, such as options 234, 235, 237, and 238 may be provided as part of screen 232 to provide access to various interactive television application features. For example, option 238 may be selected to access options for ordering the selected video-on-demand content. Option 237 may be used to access options for recording the selected content, and option 235 may be used to access options for setting parental control locks for the selected content. If the user selects option 234, the interactive television application may display a video clip containing information on the video-on-demand content of interest (e.g., a promotional video such as a preview, a trailer, a review, etc.). The video clip may be delivered to the user equipment 18 from a server such as server 36 or server 56 of FIG. 1 or from equipment at a service provider such a service provider 50. The interactive television application may also provide the user with additional information on the video-on-demand content in response to the user selecting option 234. Other suitable selectable options may also be provided on screen 232 (e.g., a program package information and purchase option, options for searching program listings for related content, etc.).

Figure 17B:
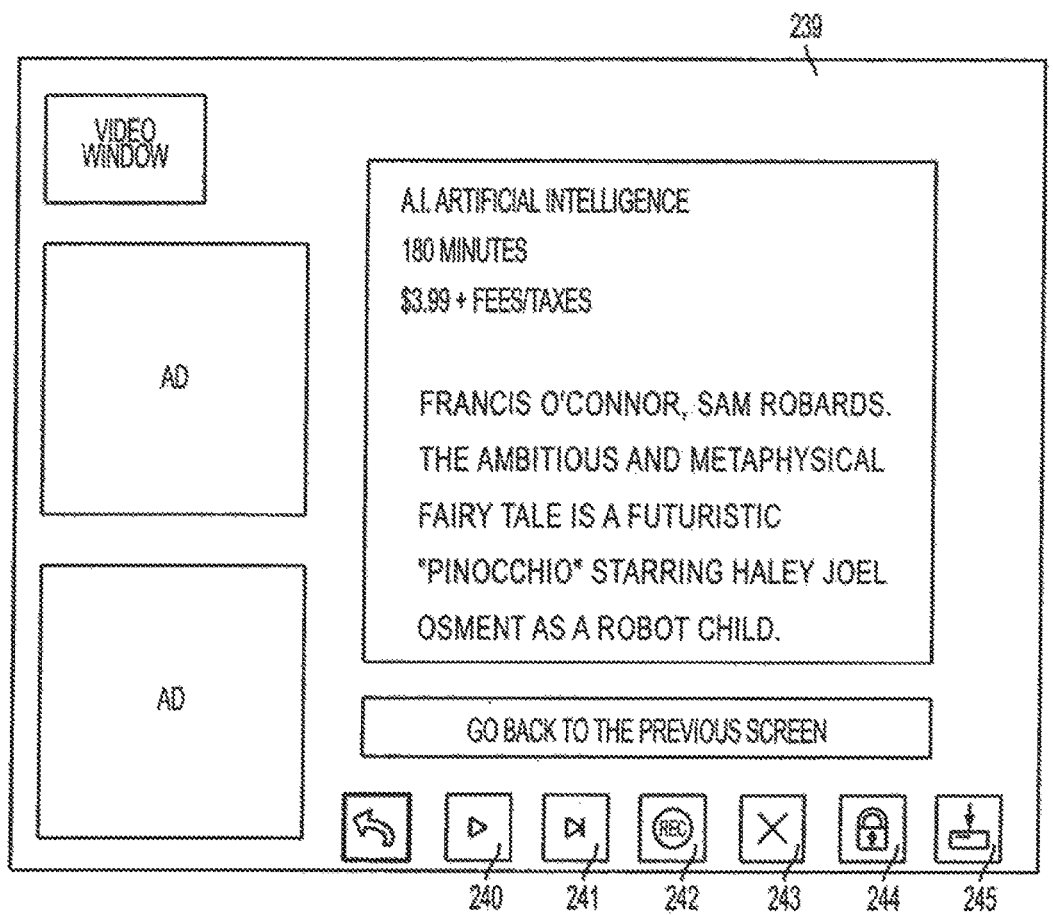

If a user requests information for video-on-demand content that has already been ordered, the interactive television application may provide video-on-demand information screen such as screen 239 of FIG. 17b, which may include selectable options different than those provided for screen 232 of FIG. 17a. For example, option 240 may be used to start playing selected video-on-demand content from the program position most recently viewed. Option 241 may be used to present the selected content from the beginning, and option 242 may be used to access options for recording the content. Option 243 may be used to remove the selected content from a listing of the ordered and available content. Option 244 may be used to access options for setting parental control locks for the selected content. If the selected content is being accessed over a network or being provided by a network storage device, option 245 may be used to store the content on a local storage device.

In response to a user ordering selected content (e.g., by selecting an on-screen order option such as option 238 of FIG. 17a, or by using remote control 72 or any other suitable input device 118 to order content, etc.), the interactive television application may deliver the ordered video-on-demand content to the user equipment from a server such as server 36 or server 56 or from a service provider such as service provider 50. The communications paths and communications network 34 of FIG. 1 may be used in delivering the requested content.

Figure 18:
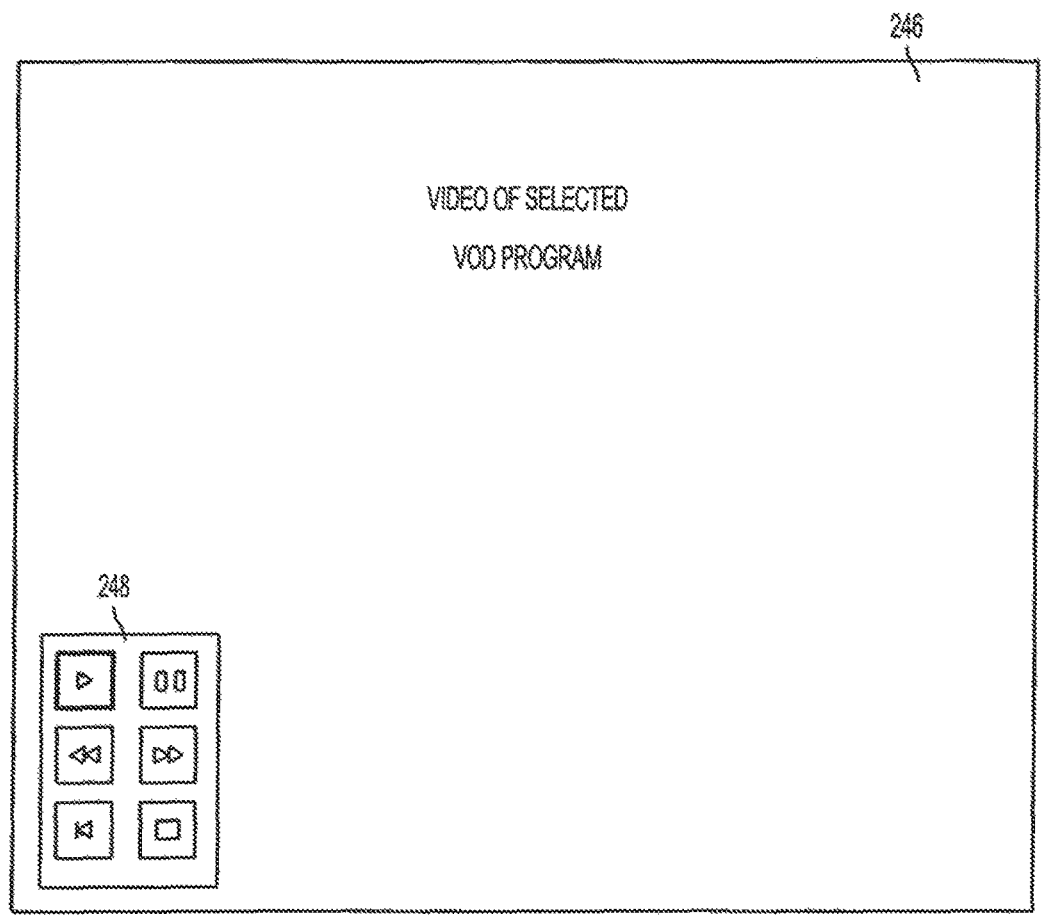
FIG. 18 is an illustrative display screen showing how video-on-demand playback controls may be displayed while video-on-demand content is being displayed for the user in accordance with the present invention.

The ordered video-on-demand content may be displayed for the user on a display screen such as video-on-demand playback screen 246 of FIG. 18. As shown in the lower portion of screen 246, interactive options may be displayed in a toolbar 248 or other suitable format. The interactive options 248 (or similar remote control buttons) may allow the user to rewind the video-on-demand content to the beginning, rewind, play, fast-forward, pause, stop delivery of the video-on-demand content, or perform other video playback options. The arrangement of FIG. 18 is merely illustrative. For example, the video-on-demand content may be played back in a reduced size window (of fixed or user-selectable size).

The interactive television application may allow the user to establish parental control settings. For example, the user may lock a particular program, a program rating, a channel, a type of content (e.g., violent or sexual content), or may establish a parental control setting that blocks all television viewing during a particular period of time. A user may be required to enter a personal identification number (PIN) to unlock blocked content.

With one illustrative arrangement, a parent (or other suitable user) may select a program to block by highlighting the program listing for that program in a suitable program listings screen (e.g., a screen such as screen 138 of FIG. 8). After highlighting the program to be blocked, the parent may press lock key 92 on remote control 72 (FIG. 4). The parent may also access options for setting parental locks by selecting an on-screen parental control lock option provided by the interactive television application (e.g., option 234 of FIG. 17*a*, option 244 of FIG. 17*b*, etc.).

Figure 23A:
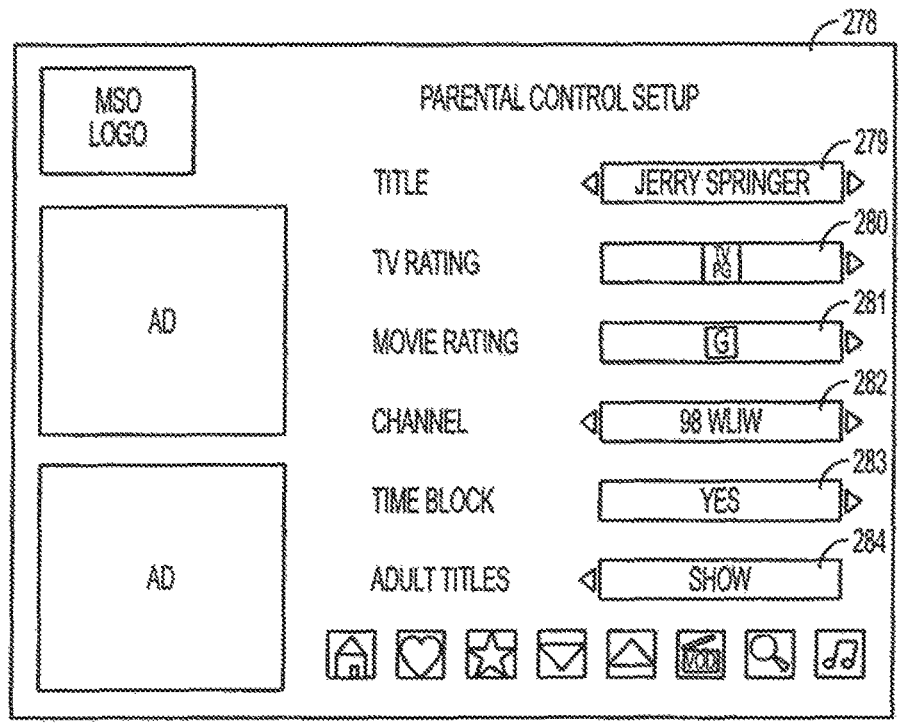
FIG. 23a is an illustrative display screen showing how a user may set parental controls for a given program in accordance with the present invention.

In response to a user selecting an on-screen option or remote control key to access parental control lock options, the interactive television application may display a display screen such as parental controls display screen 278 of FIG. 23*a*. Parental controls options may be accessed from a main menu, a selected program, or any other suitable program guide screen. Users may set parental locks for a selected program or a range of programming by selecting from various criteria. For example, users may select to block programs according to title 279, TV rating 280, movie rating 281, channel 282, or any other suitable criteria. Block ratings options 280 and 281 may allow users to block all programming with a given rating (e.g., the same rating as the selected program or a user-input rating or range of ratings). The user may be provided with other options for applying parental lock settings by selecting, for example, (YES/NO) time block option 283. A user may also select to hide or show adult titles by selecting option 284. Other selectable options may also be provided in screen 278.

Figure 23B:
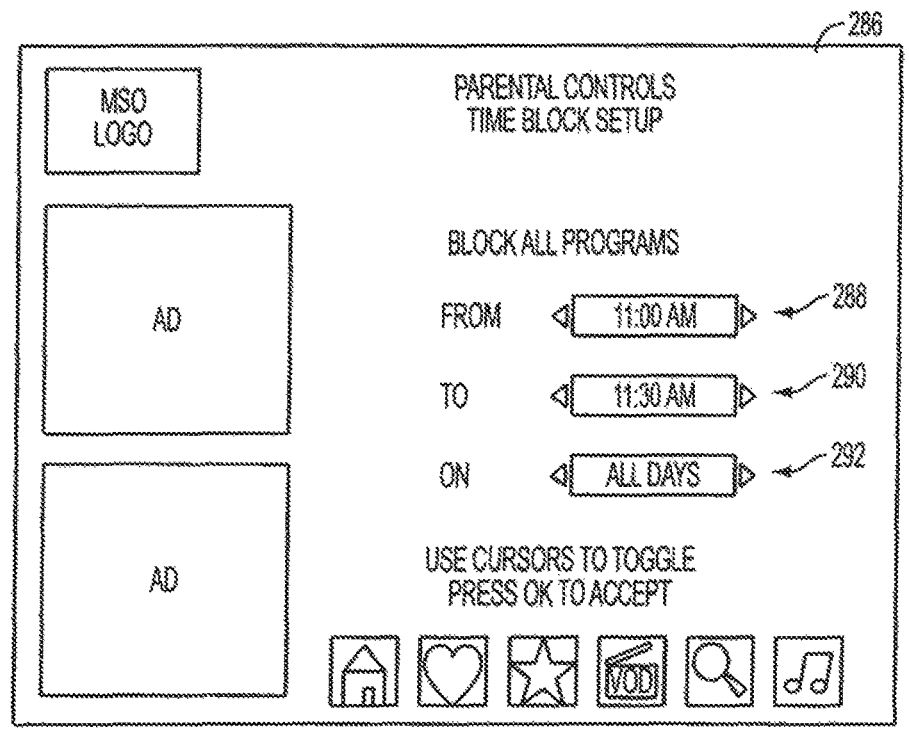
FIG. 23b is an illustrative display screen showing how a user may block content by creating a time-based parental control setting in accordance with the present invention.

If the user has selected "YES" for time block option 283, a time block sub-menu may be provided, for example, screen 286 of FIG. 23*b*. The user may use the on-screen options of screen 286 to set a beginning time (option 288) and ending time (option 290) for the parental control time period. The user may use option 292 to make the parental control setting effective for all days of the week, certain groups of days (e.g., week days or weekend days), or a particular day or days. The user may press OK key 84 when finished. Other selectable options may also be provided as part of screen 286.

The parental control screens 278 and 286 of FIGS. 23*a* and 23*b* are merely illustrative. Any suitable on-screen options or other user interface arrangement may be used to allow a parent (or other user) to block (parentally-control) programming airing during a particular period of time, programming on a particular channel or channels, programming with a certain rating, individual instances of certain programs, etc.

The interactive television system 10 may be used to support video recorder functions. The video recorder functions may be supported using local arrangements (e.g., arrangements in which a personal video recorder or other suitable equipment in the user's home is used to record videos on a local hard drive or other storage device) and network-based arrangements (e.g., arrangements in which network equipment such as servers 36 and 56 or equipment at a service provider such as service provider 50 is used to store video and data for the user). Combinations of these arrangements may also be supported using system 10.

In a local video recorder arrangement (sometimes called a personal video recorder arrangement or local digital video recorder arrangement), video recordings are stored locally on the user equipment. Information on which videos have been recorded may also be maintained locally. Program guide information (e.g., titles, rates, descriptions, categories, etc.) may also be maintained for the recorded videos. When a user desires to view a list of the recordings that the user has stored on the user equipment, the interactive television application may retrieve this information from local storage and may display this information to the user locally on user equipment 18. The user may then select a desired recording to play back.

In a network-based video recorder arrangement (sometimes called a client-server video recorder arrangement), videos may be stored on the network (e.g., at servers such as servers 36 and 56 or at a service provider such as service provider 50). Information on which programs have been recorded for the user may be stored locally and on the network (e.g., at servers such as servers 36 and 56 or at a service provider such as service provider 50).

Network-based recordings may be made in a number of ways. For example, some or all of the regularly-broadcast television programming provided by programming sources 12 may be automatically recorded or copies of this programming otherwise maintained on a suitable network storage device such as server 36, server 56, or equipment at a service provider such as service provider 50. If the user chooses to "record" a program, no actual recording need be made, because a copy of the desired program already exists on the system. With this type of arrangement, virtual recordings take the place of real recordings.

The user may be given a "personal area" on the network. The personal area may be accessed when the user enters an appropriate personal identification number or by virtue of the user's connection to the network through a known or trusted communications path (e.g., when the user is connected through a dedicated cable path to a server at a cable system headend such as a server 56 at television distribution facility 14 of FIG. 1).

The personal area may be used to maintain a list of the video content that the user has recorded. Whenever the user directs the network-based video recorder portion of the interactive television system to make a recording, the system updates the user's personal area to make it appear as though an additional "real" copy of the requested recording has been made. The network-based video recorder implemented with this approach therefore conserves storage space, while providing users with the illusion of access to a network-based video recorder dedicated to their personal use.

Alternatively, there may be no personal area and each user may have access to all previously recorded content to which they had rights when originally broadcast.

As another example, some or all of the content for which a user requests that a recording be made may be recorded by creating actual copies (e.g., digital recordings) of the requested content. These actual copies may be stored on network equipment (e.g., servers such as servers 36 and 56 or equipment at a service provider such as service provider 50).

Programs recorded onto a network server may be copied to a user's local storage.

A combination of these approaches may be used if desired. For example, some content may be automatically retained by the system (e.g., copies of popular programming). The user may make virtual recordings of this material. The presence of the virtual recordings may be reflected in the user's personal area. Other content may be stored in the form of actual recordings at the direction of the user (e.g., less popular content). The presence of these recordings may also be reflected in the user's personal area.

Regardless of the way in which network-based recordings (virtual or real) and local recordings are made, the interactive television application may be used to provide the user with interactive display screens that assist the user in making recordings, managing recordings (e.g., editing recordings, deleting recordings, renaming recordings, sending recordings to other users over the communications paths of FIG. 1, etc.), playing back recordings, viewing information about recorded programs, etc.

Figure 19A:
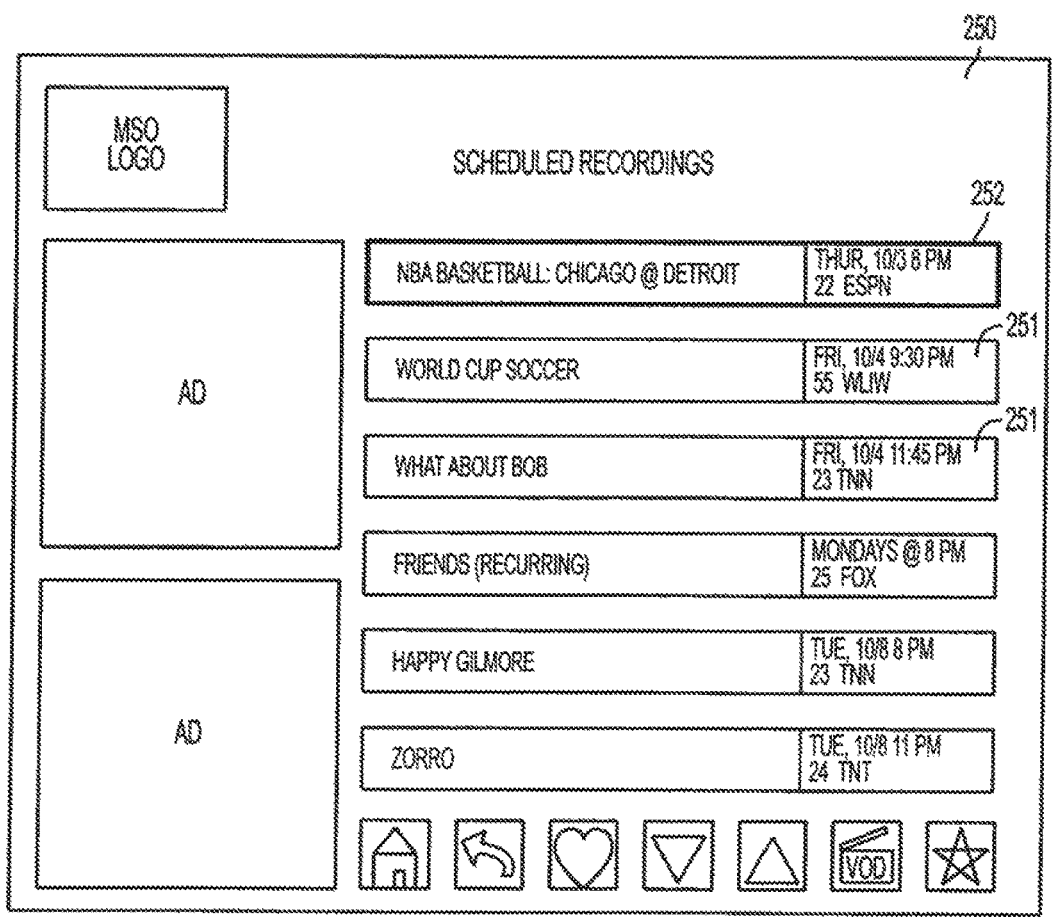
FIGS. 19a and 19b are illustrative display screens showing how a user's scheduled recordings may be presented and selected in an interactive list in accordance with the present invention.

Once a program has been selected by a user for recording, the selected program may be presented in an interactive list of programs scheduled to be recorded. An illustrative scheduled recordings screen 250 that may be displayed for the user on user equipment 18 is shown in FIG. 19a. Screen 250 may be displayed by the interactive television application when the user selects an option provided by another program guide screen, such as program guide screen 120 of FIG. 7 or any other suitable option. Screen 250 may include, for example, a list of programs scheduled to be recorded 251. A highlight region 252 may be used to select a scheduled recording from the list. The user may position highlight region 252 on a desired scheduled recording and select the scheduled recording using an appropriate key of remote control 72.

Figure 19B:
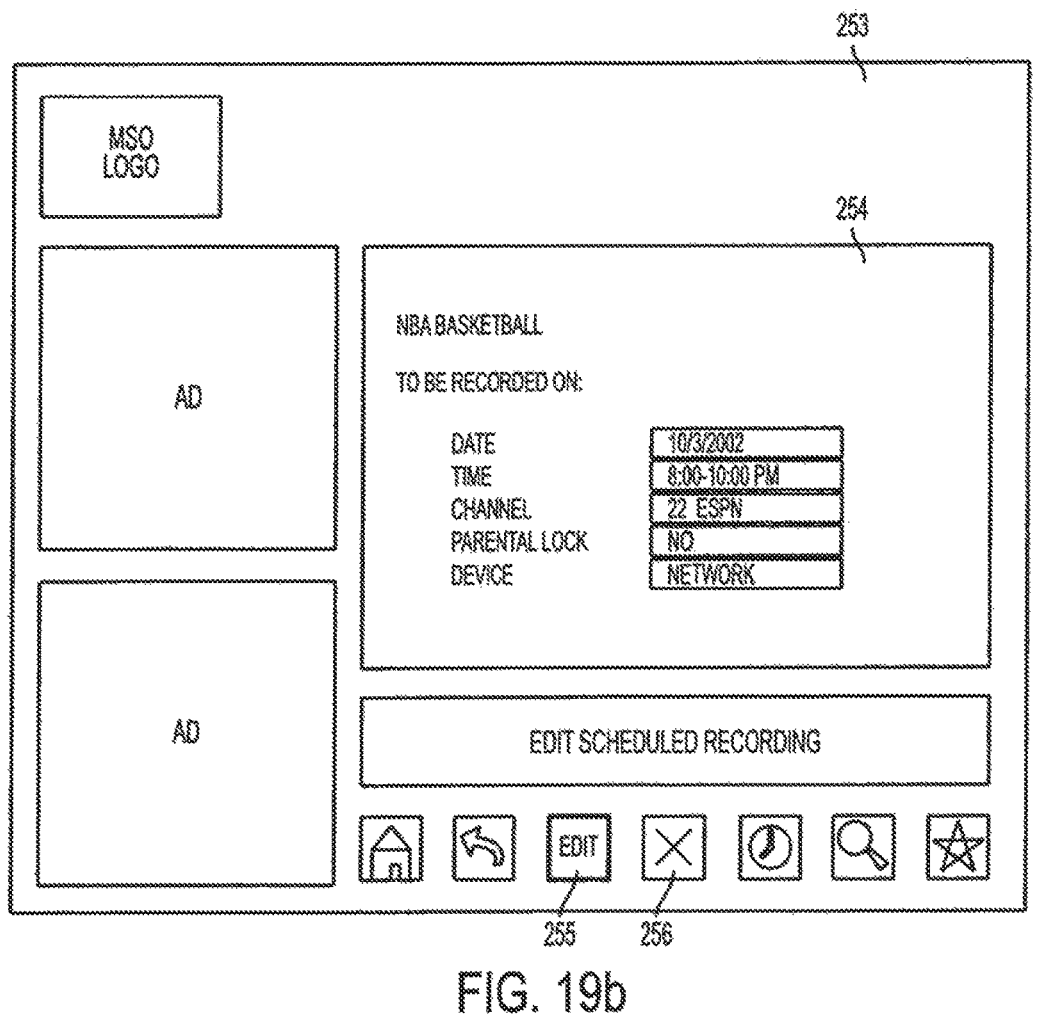

Information about a scheduled recording selected by the user may be presented in a screen such as screen 253 of FIG. 19b. Screen 253 may include scheduled recording information 254, which may show the date, time, and channel for which a program is to be recorded. Information 254 may also indicate which device has been designated to record the program and whether a parental lock is set for the program scheduled to be recorded. The user may edit information 254 by selecting edit option 255 using a highlight region. Other selectable options may be provided in screen 253, for example cancel option 256 which the user may select to cancel the scheduled recording.

Figure 20A:
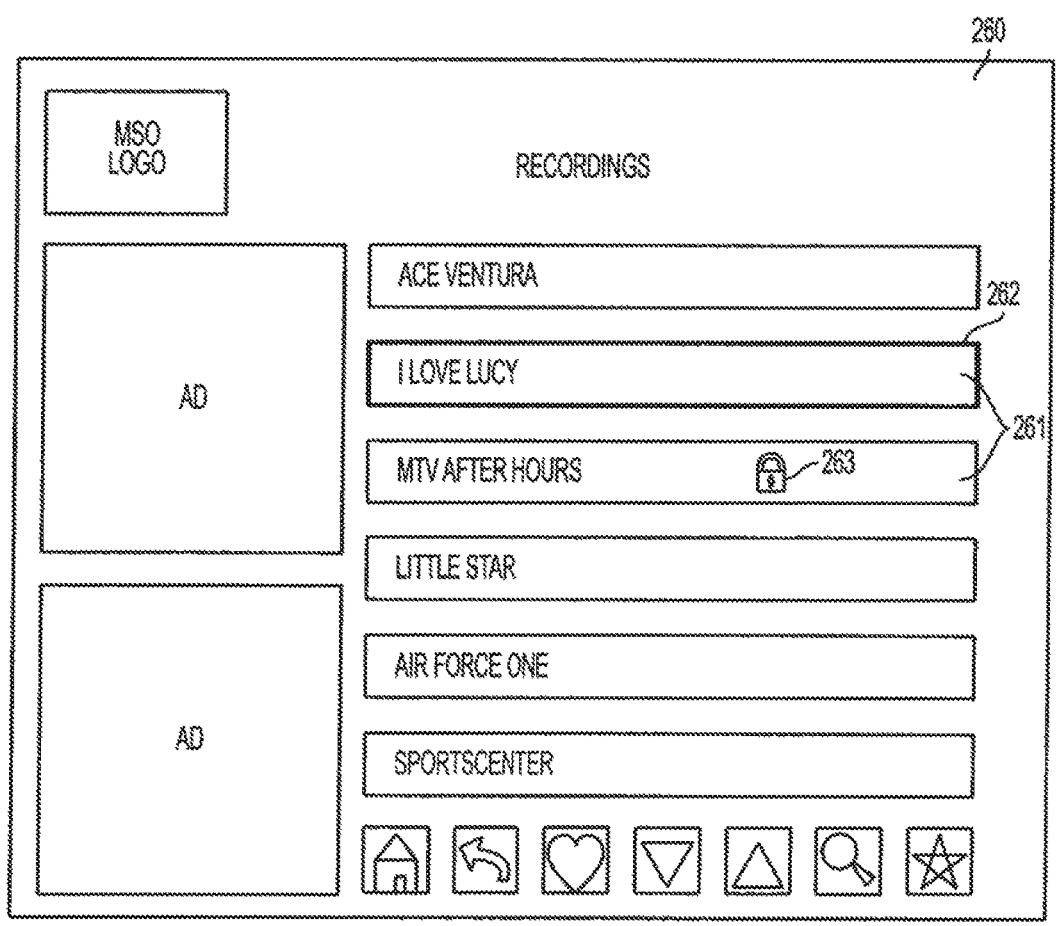
FIGS. 20a and 20b are illustrative display screens showing how a user's recordings may be presented and selected from an interactive list in accordance with the present invention.

Once a program has been recorded, a program guide screen may be presented to display recorded programs. An illustrative video recordings screen 260 that may be displayed for the user on user equipment 18 is shown in FIG. 20. Screen 260 may be displayed by the interactive television application when the user selects an option provided by another program guide screen, such as program guide screen 120 of FIG. 7 or any other suitable option. The recordings 261 may be local recordings that are stored on the user's equipment 18 or may be real or virtual network-based recordings (e.g., network-based content stored on equipment such as server 36 or server 56 or at service provider 50). In a network-based video recorder environment with a personal area, screens such as screen 260 provide access to all or part of the user's personal area. The user may navigate through the personal area using remote control 72 or other suitable user interface 18.

Screen 260 may include a list of the user's recordings 261. Recording listings may include the time and channel the program was recorded or any other suitable information. The user may position highlight region 262 to select a recording of interest (e.g., to view that recording, to view information about that program, to delete the program, etc.). The user may position highlight region 262 on a desired recording and select the recording using an appropriate key of remote control 72.

Figure 20B:
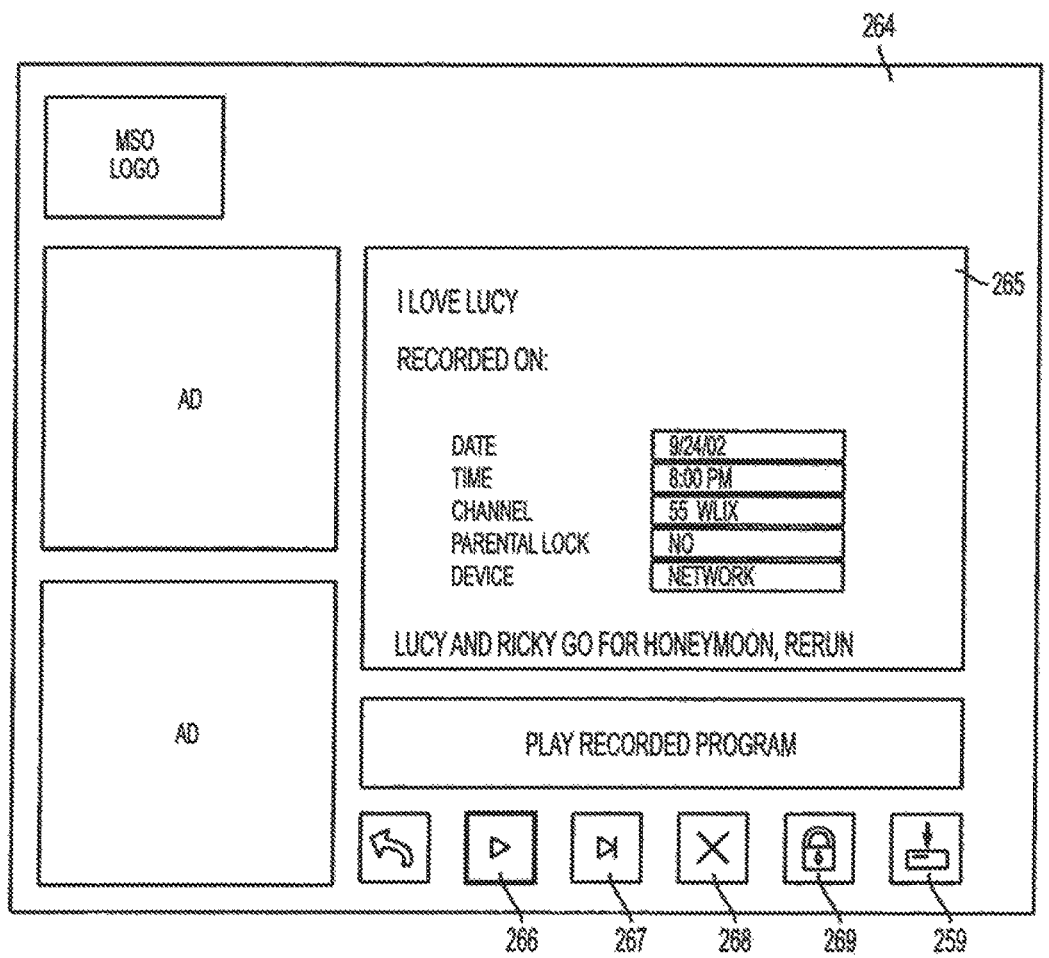

Information about a recording selected by the user may be presented in a screen such as screen 264 as illustrated in FIG. 20b. Screen 264 may include recording information 265, which may show the date, time, and channel the program was recorded. Information 265 may also show whether a parental lock is set for the recording and what device has been designated to store the recording. The user may play the recording by selecting option 266. The user may play the selected recording from the beginning by selecting option 267. Option 268 may be selected to delete the recording from the list of recordings. Option 269 may be used to set a parental lock for the selected recording. If the selected recording is being stored on a network video storage device, the user may select option 259 to transfer the recording to a local storage device. On-screen options may be selected using a highlight region and a remote control, or by any other suitable method.

Figure 21:
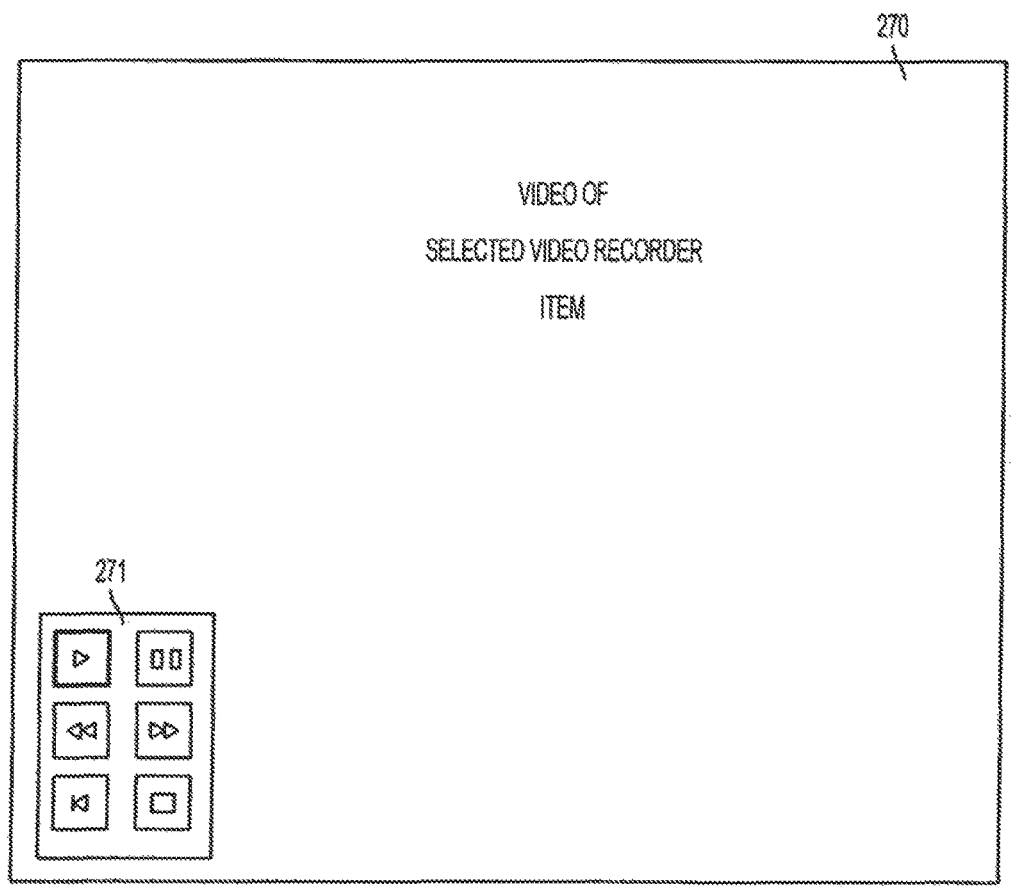
FIG. 21 is an illustrative display screen showing how video for a recording selected from the list of FIG. 18 may be displayed for the user in accordance with the present invention.

When a given recording is selected for playback, for example by selecting play option 266, a display screen such as display screen 269 of FIG. 21 may be presented. Display screen 269 may include the video 270 of the selected program that is being played back to the user and options 271 for controlling the video. Options 271 may, for example, include options that allow the user to rewind the video to the beginning, to rewind or reverse the video, to play the video, to fast-forward the video, to pause the video, or to stop the video. Control of these functions and other interactive television application functions may be supported using on-screen options, dedicated or multi-purpose keys on remote control 72 or other user devices, or other suitable arrangements involving user interface 118. When on-screen options are used, the options may be displayed in the form of one or more overlays on top of video 270 or video 270 may be provided in a reduced-size window and the options displayed outside of this window.

With the arrangement of FIGS. 20 and 21, the user can browse the user's recordings and can play back (and control the playback) of these recordings. Recordings that are stored locally on user equipment 18 may be played back by retrieving these recordings from the local hard drive or other storage on which the recordings are maintained. Recordings that are stored on the network may be played back from the network equipment on which the recording content is stored. User equipment 18 may receive such content in the form of a real-time video stream or a file download and the interactive television application may play back the received content using a display screen arrangement of the type shown in FIG. 21.

The user may record programming by indicating interest in a program for recording by highlighting a program of interest on a suitable display screen provided by the interactive television application and pressing a record key, by selecting a program for recording from a flip or browse display, by tuning to a desired program and selecting an appropriate record button, by selecting a record option from an information screen, etc. For example, the user may highlight a program in a program listings screen such as screen 138 of FIG. 8, or may display a program listing of interest on a flip display such as flip display 153 of FIG. 9 or on a browse display such as browse display 160 of FIG. 10. When the user presses a suitable remote control key such as record key 86 of FIG. 4, the interactive television application may record the desired program.

Figure 22:
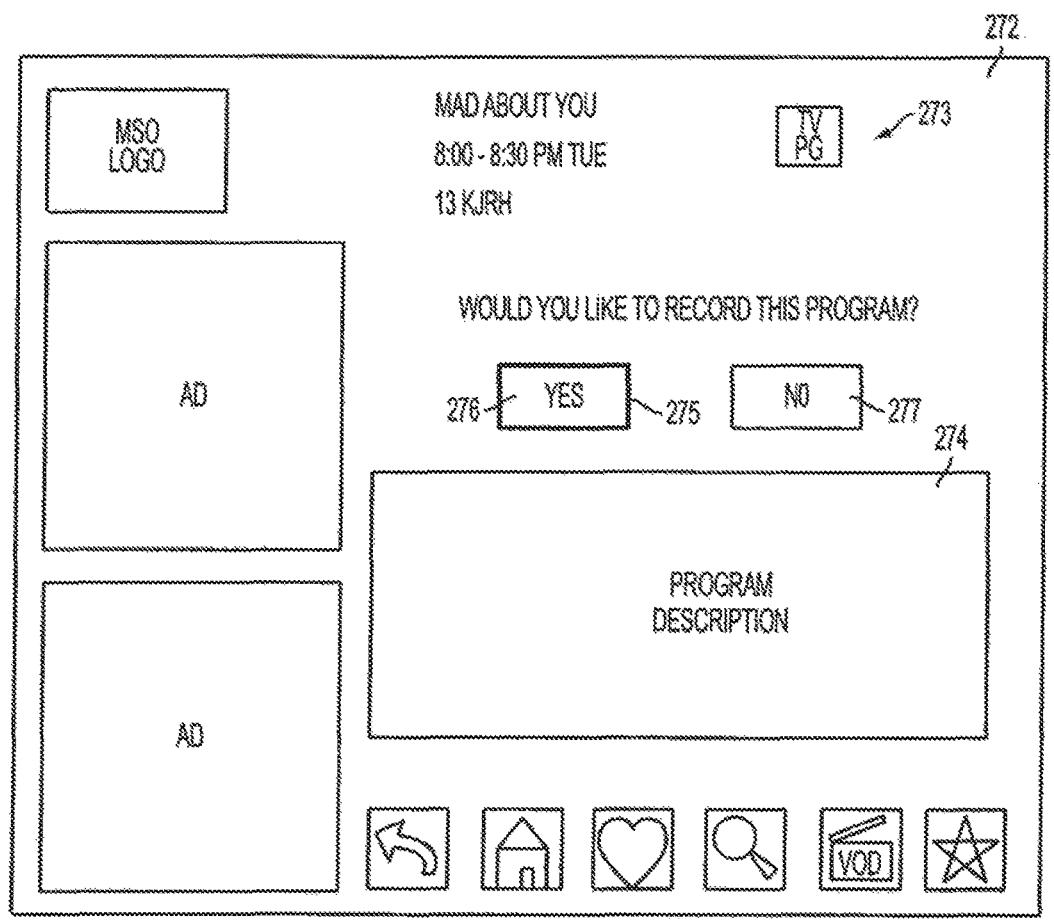
FIG. 22 is an illustrative display screen showing how the user may be provided with options that allow the user to schedule a recording of a desired program in accordance with the present invention.

The interactive television application may automatically record the program that the user selected or may provide one or more additional confirmation and information screens after the user presses the record key 86. As an example, the interactive television application may display a screen such as record set-up screen 272 of FIG. 22. As shown in FIG. 22, screen 272 may include title and ratings information in region 273 and a program description 274. The user may be provided with information on the scheduled broadcast time for the selected program. If the user desires to record the program, the user may position highlight region 275 on top of YES option 276 and may press OK key 84. If the user does not wish to record the program, the user may position highlight 275 on top of NO option 277 and may press the OK key 84. If desired, other options such as series recording options, recording quality options, and buffer time options may be provided.

When the user directs the interactive television application to record a given program, the interactive television application will record the program using the local capabilities of user equipment 18 or using the network-based video recorder capabilities of the system 10, depending on the equipment of the user, the capabilities of system 10, and system and user settings.

After the program has been recorded, the user may use the interactive television application to view information on the user's recordings (e.g., using a display screen arrangement of the type shown in FIG. 20). These techniques for supporting recording functionality in the interactive television application are merely illustrative. Any suitable arrangement for recording (as real recordings or as virtual recordings and locally or on network equipment) may be used if desired.

Because the network-based or local personal video recording capabilities of system 10 may be used to time-shift broadcast programming, the user may be provided with an opportunity to defer or reschedule the viewing of a given program as desired. For example, the interactive television application (e.g., a program guide application) may provide on-screen options that the user may select to choose a suitable deferred time at which to receive a reminder for the program.

If the user chooses not to defer the reminder, the interactive television application may provide a reminder for the user just before the scheduled broadcast time of the program. The user may view the program at this time as it is broadcast. If the user chooses to defer the reminder, the interactive television application may provide the reminder at a later time (e.g., two hours after the original broadcast time when no broadcast is scheduled). The user may view a recording of the program at this time by playing back the recording from the network-based or local personal video recorder.

Programs may be recorded by using network-based or local personal video recording systems. Local video recording arrangements may include a personal video recorder or other suitable equipment in the user's home, and such equipment may store videos on a local hard drive or other suitable storage device, such as recording devices 62 or 66 (FIGS. 2 and 3, respectively).

Programs may also be recorded by a network-based system. Network-based arrangements for storing video and data for the user may include equipment such as servers 36 and 56 or equipment at a service provider such as service provider 50. Information about these stored programs may be stored locally and on the network.

Network-based recording of programs may be performed automatically or otherwise maintained by the system. Accordingly, when a user chooses to "record" a specific program, a "virtual" recording (rather than an "actual" or "real" recording) may be made that refers to the existing recording of the desired program on the system, thereby conserving storage space on the network. The network may also include personal areas for each user, in which a list of the user's recordings may be maintained. This list of recordings may include both virtual recordings and actual (or real) recordings. Actual recordings may also be stored in the personal area, either by directly recording the desired program or by creating a copy of the network-based recording in the user's personal area. Access to the user's personal area may be controlled by entry of the user's personal identification number, or by a trusted or known communications path associated with the user, as described above.

Combinations of these arrangements may also be used. For example, a user's list of recordings may include virtual recordings (that refer to network-based recordings), actual recordings that are stored in the user's personal area on the network, and actual recordings that are stored on a local personal video recorder equipment. A user's network-based or locally-stored actual recordings may result from direct recording of the programs. Alternatively, or in addition, actual recordings in the user's personal area or local personal recording device may result from creating copies of the network-based recordings and storing them in the user's network-based personal area or local personal video recorder.

Accordingly, it is understood that the features described herein may be used with both network-based and locally-stored recordings of programs, using network-based or local personal video recorders, as well as actual and virtual recordings of programs. Video recorders may include either or both network-based video recorders and local personal video recorders. Reminders for programs as described below may be used with programs stored using any other suitable storage arrangements as well.

Figure 24:
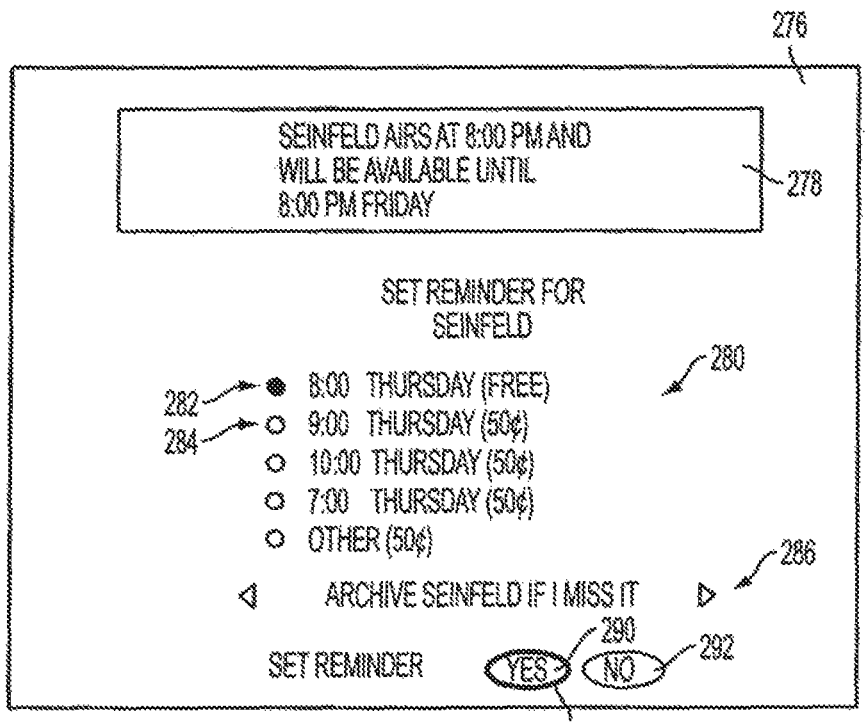
FIG. 24 is an illustrative display screen showing how the user may be provided with an opportunity to reschedule viewing of a desired television program using the network-based or local personal video recorder features of the present invention.

Any suitable arrangement may be used to allow the user to select a desired time for receiving a program reminder for a program. One illustrative display screen arrangement that may be used is shown in FIG. 24. Display screen 276 of FIG. 24 may be displayed by the interactive television application when the user selects a desired program from a grid or other list of scheduled programs (e.g., using highlight region 144 of list 138 of FIG. 8). (When the selected program is not available at any other time than the originally-scheduled broadcast time—e.g., because video recording of the program is prohibited or otherwise not available—the interactive television application may display a set reminder screen reminder such as the set-reminder screen of FIG. 12 and may display reminders of the type shown in FIG. 13.)

As shown in FIG. 24, screen 276 may include an information region 278 that identifies the selected program (Seinfeld in this example). Information region 278 may also contain information on the originally-scheduled broadcast or air time for the program (e.g., 8:00 PM tonight) and information on the longer-term availability of the program through the network-based video recorder (e.g., until 8:00 PM Friday).

In some situations, certain programs may be available for long periods of time or even indefinitely. On other situations, programs will be deleted from the system (or at least the publicly available portion of the system) to save on storage space or to follow the practices of the system operator. Programs that will only be available for a fixed period of time may be referred to as having expiration dates. In the example of FIG. 24, the network-based recording (copy) of Seinfeld will be available only until 8:00 PM on Friday, after which it will expire.

Options 280 may be provided to allow the user to select a desired viewing/reminder time for Seinfeld. The user may select a desired viewing time by using remote control cursor keys 82 to position a highlight region on a desired option and by pressing the OK key 84 to mark that option.

The user may select option 282 to set a reminder for Seinfeld at its original scheduled broadcast time (8:00 PM Thursday). The user may select an option such as option 284 when it is desired to set a reminder for a time other than the originally scheduled broadcast time. If desired, deferred viewing may be provided as a premium (fee-based) service. With this type of arrangement, a fee may be imposed in association with the user's selection of a time-shifted reminder (e.g., $0.50), as shown in FIG. 24.

If the user selects option 282, the interactive television application may display a reminder for the user on the user's equipment 18 at 8:00 PM (or a short time before 8:00 PM) on Thursday. If the user selects option 284, the interactive television application may display a reminder for the user on the user's equipment 18 at 9:00 PM (or a short time before 9:00 PM) on Thursday. (The user may select any of the other options 280 to set a reminder for another desired time.)

Figure 27:
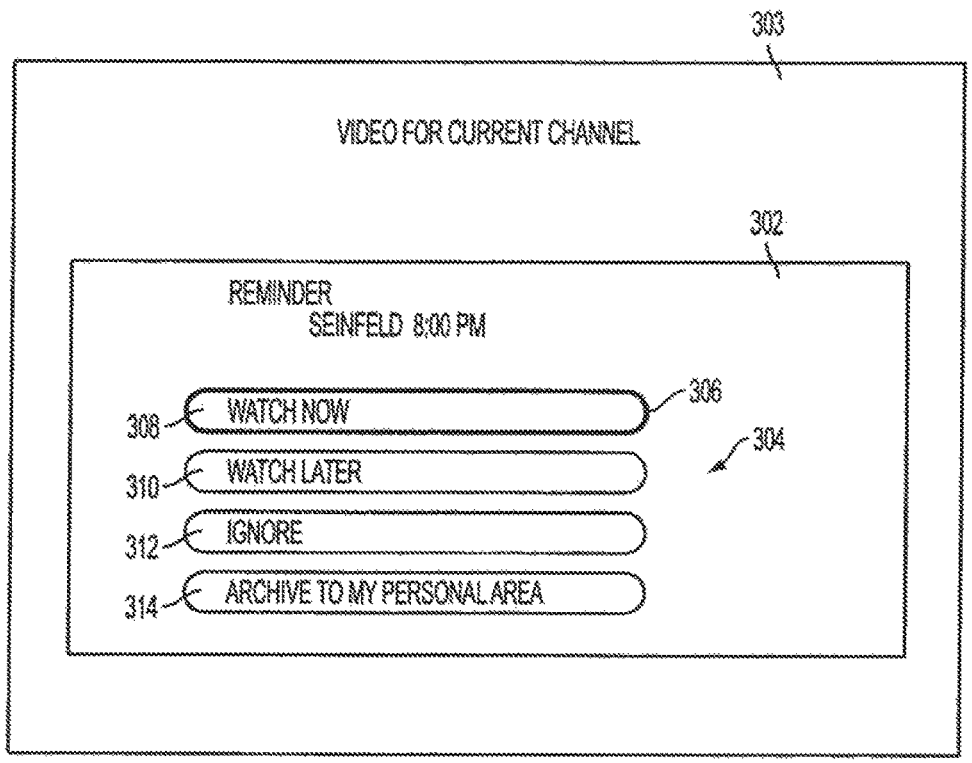
FIG. 27 is an illustrative display screen showing how a program reminder may be provided that includes options such as a watch later option and an archive-to-personal-area option in accordance with the present invention.

The reminder may be provided in the form of an overlay over the current television channel, may be displayed using a full-screen format, may be displayed in the form of an icon, or may be provided using any other suitable arrangement. An illustrative reminder is shown in FIG. 27. In the example of FIG. 27, the reminder is provided in the form of an overlay 302 that is displayed in a display screen 303 on top of video for the current channel.

The reminder may include a number of selectable options 304 that the user may select by proper positioning of highlight region 306. Options 304 may include a watch now option 308 that the user may select to watch the desired program immediately. Option 310 may be used to defer viewing. Option 312 may be selected when the user desires to cancel the reminder and hide the reminder display 302. Option 314 may be selected if the user wants to archive a copy of the program to the user's personal area on the network-based video-recorder or the local personal video recorder.

If a reminder is being provided at the scheduled broadcast time for the selected program (e.g., at 8:00 PM on Thursday for the present example), selection of the watch now option 308 directs the interactive television application to tune the user's equipment to the appropriate channel to view the scheduled airing of the desired program. If a reminder is being provided at a time later than the scheduled broadcast time, the program will have been recorded using the network-based or local personal video recorder. Accordingly, selection of watch now option 306 will direct the network-based video recorder to play back the program on the user equipment (e.g., using a playback arrangement of the type shown in FIG. 21 or any other suitable video recorder arrangement).

Different content management arrangements may be used to store and maintain copies of broadcast content on system 10. In one illustrative arrangement, the network equipment (e.g., server 56, server 36, or equipment at service provider 50) may be used to "record" or maintain copies of all or substantially all broadcast programming that is provided to the users. For example, all or substantially all incoming broadcast programming may be automatically recorded and maintained on a server 56 at a cable system headend. In another illustrative arrangement, only some of the broadcast content may be stored automatically. For example, popular situation comedies may be recorded and unpopular news programs may not be recorded. In yet another illustrative arrangement, programs are recorded when requested by a user. For example, if a user requests that a particular movie be recorded, the network-based video recorder will store a copy of that movie for the user. These approaches may be combined if desired. In another arrangement, the foregoing storage and maintenance arrangements may use local storage equipment, in addition to network-based storage arrangements. Moreover, in both arrangements, copies of programs and other content may be stored in the form of either real copies (e.g., individual files on the servers, personal video recorders, or other local or network equipment) or may be stored in the form of virtual copies (e.g., suitable database records or other information that is associated with one or more actual copies).

If all or some of the broadcast programs being aired are being automatically recorded by the network-based or local personal video recorder, it may be desirable to present the user with an option such as archive option 286 on reminder set-up screen 276 of FIG. 24. The user can use remote control keys to toggle option 286 between an option such as "archive Seinfeld to my personal area if I miss it" and "do not record a copy." If the archive option has been selected, the interactive television application may monitor the user's activities to determine whether the user is watching Seinfeld at the time for which the reminder was set. If the user does not interact with user equipment 18 or the interactive television application during the time period at which the user was to watch Seinfeld, the interactive television application may use the video-recorder capabilities of system 10 to archive a copy of Seinfeld in the user's personal area on the network or local equipment. For example, an additional program listing ("Seinfeld") may be added to the user's recorded programs list of FIG. 20a or to the user's archive (accessed using a screen such as the screen of FIG. 32).

An archive-if-missed option may be provided on any suitable interactive television application display screen. Moreover, this functionality may be incorporated into the interactive television application as a default capability (which may or may not be disengaged by the user).

In situations in which a copy of a desired program is not scheduled to be automatically retained by the system, the user may be presented with a "record-if-missed" option in place of archive-if-missed option 286. If this option is selected (or if an equivalent function is implemented as a default) and the interactive television application determines that the user has failed to watch the selected program, the program can be recorded into the user's personal area (as either a real copy or a virtual copy) using the network-based or local personal video recorder capabilities of system 10.

To confirm the selection of a desired option 280 on screen 276 (and to confirm the user's choice of whether to automatically archive a copy of the program into the user's personal area using option 286), the user may position highlight region 288 on top of "yes" option 290 and may press OK. If the user chooses not to set a reminder (either at the original broadcast time or a time-shifted time), the user may select "no" option 292.

Using a screen of the type shown in FIG. 24, the user may be presented with the scheduled broadcast time, one or more deferred times relative to the scheduled broadcast time, and another option ("other") that allows the user to access additional screens to select from additional deferred time options or to enter a specific time (e.g., using numeric keys on the remote control). This is merely one illustrative arrangement for providing the user with the ability to set a desired reminder time.

Figure 25:
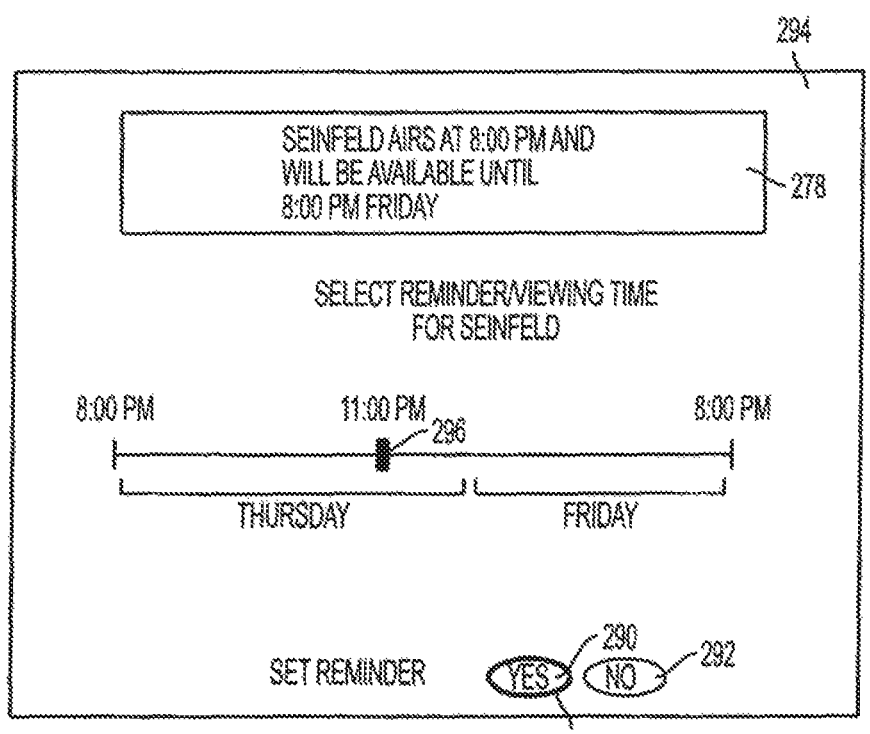
FIG. 25 is an illustrative display screen showing another way in which the user may be provided with an opportunity to reschedule viewing of a desired television program using the network-based or local personal video recorder features of the present invention.

Another possible arrangement is shown in FIG. 25. With the illustrative reminder time selection screen 294 of FIG. 25, the user may position slider 296 (e.g., using arrow keys on the remote control) at an appropriate horizontal position that represents a desired reminder time. If the user positions slider 296 at the leftmost position (i.e., the location that indicates a desired reminder time of 8:00 PM on Thursday), the interactive television application may display a reminder such as reminder 302 of FIG. 27 at 8:00 PM on Thursday. If the user positions slider 296 at the position shown in FIG. 25 and selects option 290, a reminder may be provided at 11:00 PM on Thursday.

Figure 26:
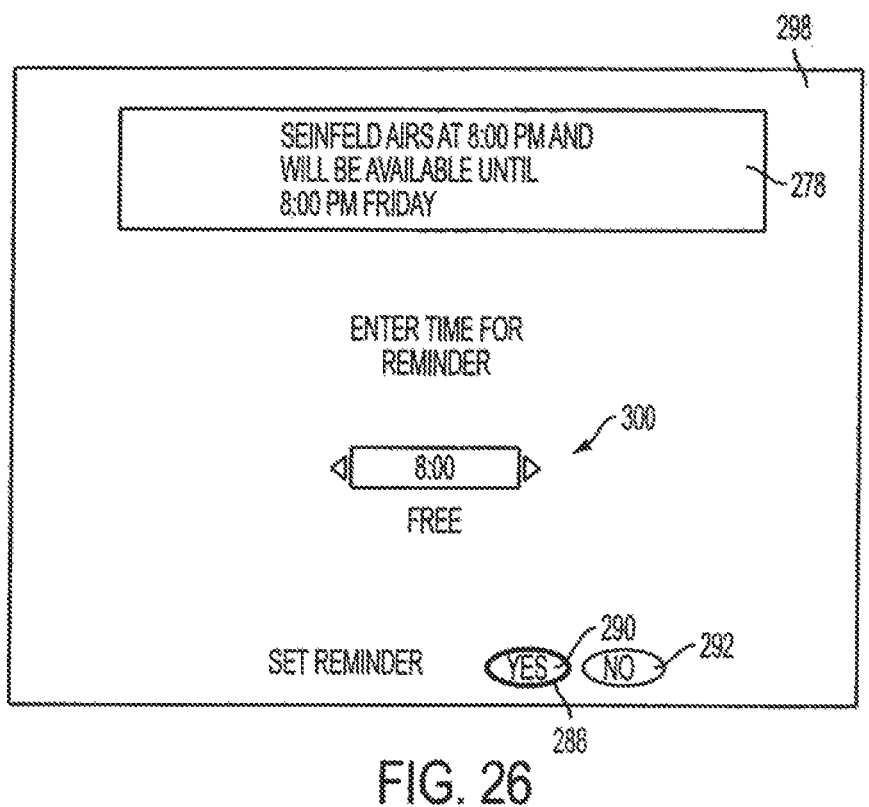
FIG. 26 is an illustrative display screen showing yet another way in which the user may be provided with an opportunity to reschedule viewing of a desired television program using the network-based or local personal video recorder features of the present invention.

Another suitable arrangement for setting reminders is shown in FIG. 26. Reminder set-up screen 298 of FIG. 26 may include a reminder time selection region 300 that the user may use to select a desired time (e.g., using cursor keys 82 or numeric keys that may appear in 76). The price associated with viewing the program at each time may be displayed in region 300 if desired. For example, "free" may be displayed when the reminder is set for the originally-scheduled broadcast time. When a reminder time is selected that is later than the scheduled broadcast time a fee (e.g., $0.50) may be displayed in region 300. If desired, a higher price may be charged for setting a reminder at a time later than the normal expiration time for the program, which would result in extending the expiration time or archiving a copy in the user's personal area or local storage. The process of setting the reminder at the desired time may be confirmed by selecting option 290.

In system environments in which copies of all or substantially all programs are automatically maintained on the network equipment, an archive-if-missed option of the type shown in FIG. 24 may be included on screens of the type shown in FIGS. 25 and 26. Price information (e.g., premium charges associated with time-shifting operations or archiving) may be provided on screens of the type shown in FIG. 25.

In system environments in which copies of some (but not all) programs are automatically maintained, an "archive-if-missed" option may be provide when the desired program is one that is scheduled for automatic recording. A "record-if-missed" option may be provided when a program is available for network-based video recorder (or local video recorder) recording. If desired, the on-screen options that are presented to the user need not distinguish between archiving operations (in which users are provided with real or virtual "archive" copies) and recording operations (in which otherwise unsaved material is affirmatively copied and saved as a real or virtual recording). Such operations may be made available to the user through on-screen options that are described as being options for "recording," "archiving," "copying," "saving," "storing," etc.

Moreover, screens 276 (FIG. 24), 294 (FIG. 25), and 298 (FIG. 26) are merely illustrative. Any suitable user interface arrangement may be used to allow a user to interact with the interactive television application when setting time-shifted reminders and associated recording and archiving options.

Regardless of the type of reminder setting screen that is used to provide the user with choices regarding when to view a program and set a corresponding reminder, at the time for which the reminder was set, the interactive television application may display or otherwise present the user with a suitable reminder. In the example of FIG. 27, the reminder is provided in the form of an overlay on top of video for the current television channel. If the user does not wish to watch the program corresponding to the reminder, the user may further defer the viewing of the program and may set a correspondingly delayed reminder by selecting watch later option 310.

Figure 28:
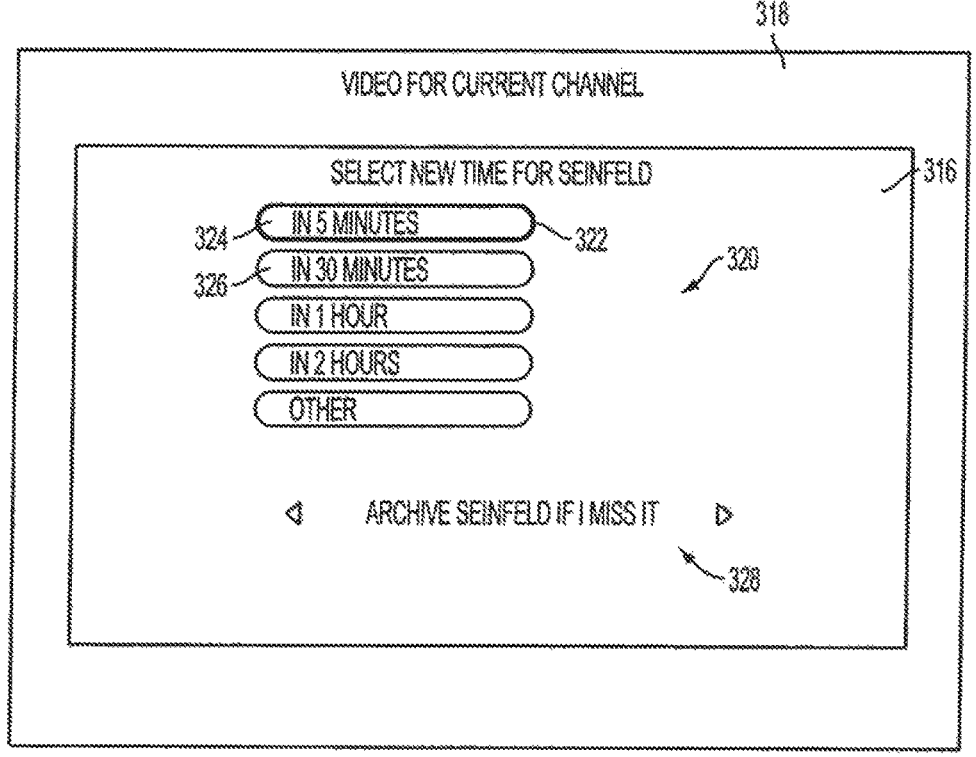
FIG. 28 is an illustrative display screen showing how the user may be provided with options for scheduling a new viewing time after selecting an option such as the watch later option of FIG. 27 in accordance with the present invention.

If watch later option 310 is selected, the interactive television application may display on-screen options of the type shown in FIG. 28. In the illustrative arrangement of FIG. 28, a menu 316 of deferred reminder time options 320 may be displayed for the user. Menu 316 may be displayed using any suitable arrangement. In the example of FIG. 28, menu 316 is displayed as an overlay on top of video for the current channel 318.

The user may choose to defer the reminder by positioning highlight region 322 on top of a desired option 320. For example, the user may select option 324 to defer the reminder for five minutes or may select option 326 to defer the reminder for thirty minutes. Other options 320 may be used to defer the reminder by other amounts. When the new reminder time arrives, the user may be presented with a reminder of the type shown in FIG. 27.

In system environments in which all broadcast programs are automatically stored on the network video recorder, menus such as menu 316 of FIG. 28 may be provided with an archive-if-missed option such as option 328. If the interactive television application determines that a user has failed to view the program, the interactive television application may create an archived copy of the missed program in the user's personal area on the network or on the local personal video recorder equipment.

In system environments in which only some programs are automatically retained by the network-based video recorder equipment of the system, the user may be presented with an option on menus such as menu 316 that allows the user to create an archived copy of the program in the user's personal area (if the program is one that is being automatically retained by the system) or allows the user to direct the network-based video recorder to record a copy of the program on the user's local equipment (if the program is one that was not being automatically retained but is available for recording).

In system environments in which programs are only recorded on the network-based or local personal video recorder equipment of the system as a result of a user request, the interactive television application may present the user with an option on menus such as menu 316 that allows the user to request that a recording be made in the event that the program is missed. When the interactive television application determines that the program has been missed, the program may be recorded into the user's personal area on the network or local personal video recorder as a real copy or a virtual copy.

Figure 29:
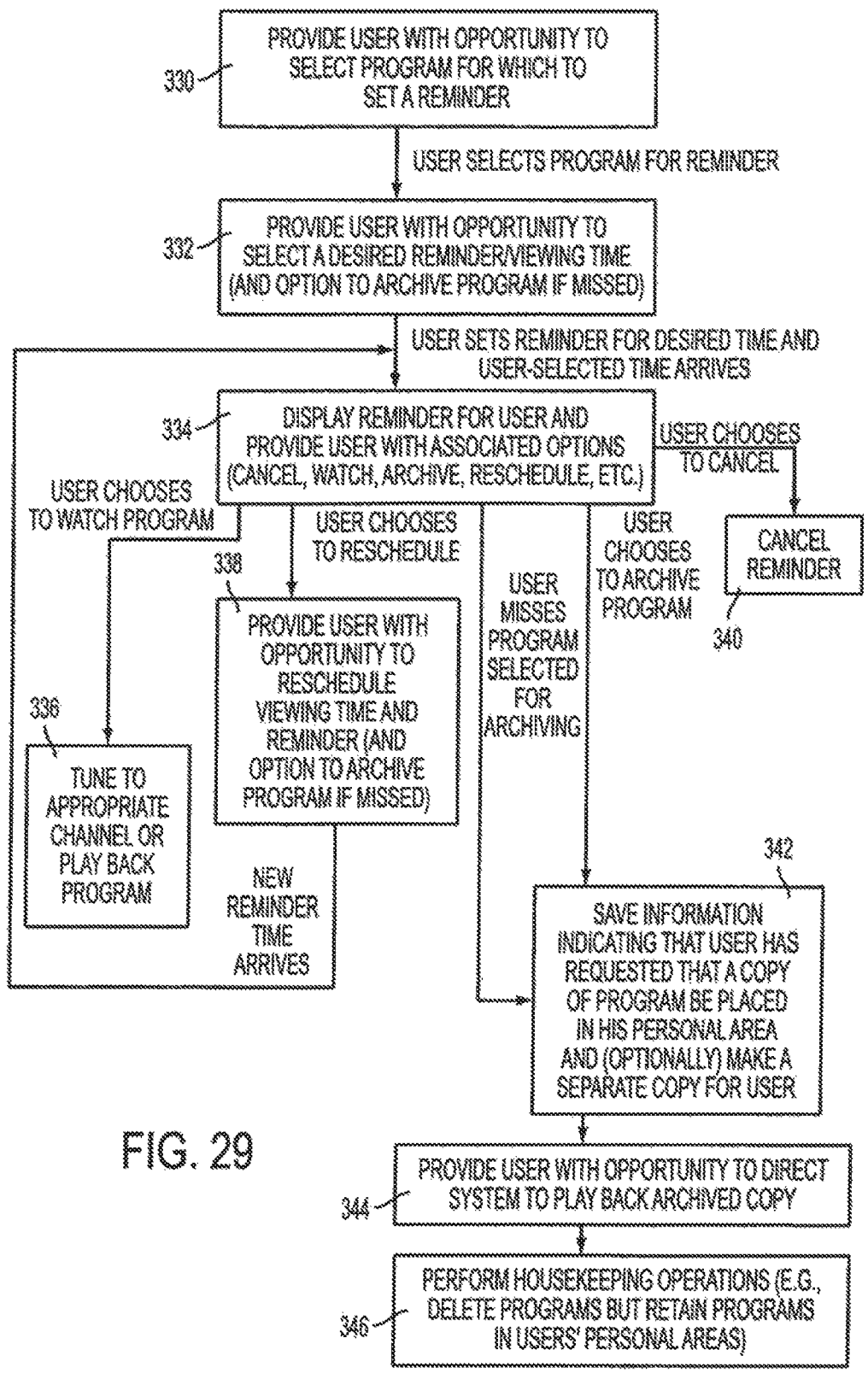
FIG. 29 is a flow chart of illustrative steps involved in handling reminder and viewing rescheduling in a network-based or local personal video recorder environment in which substantially all broadcast programming is being recorded in accordance with the present invention.
Figure 30:
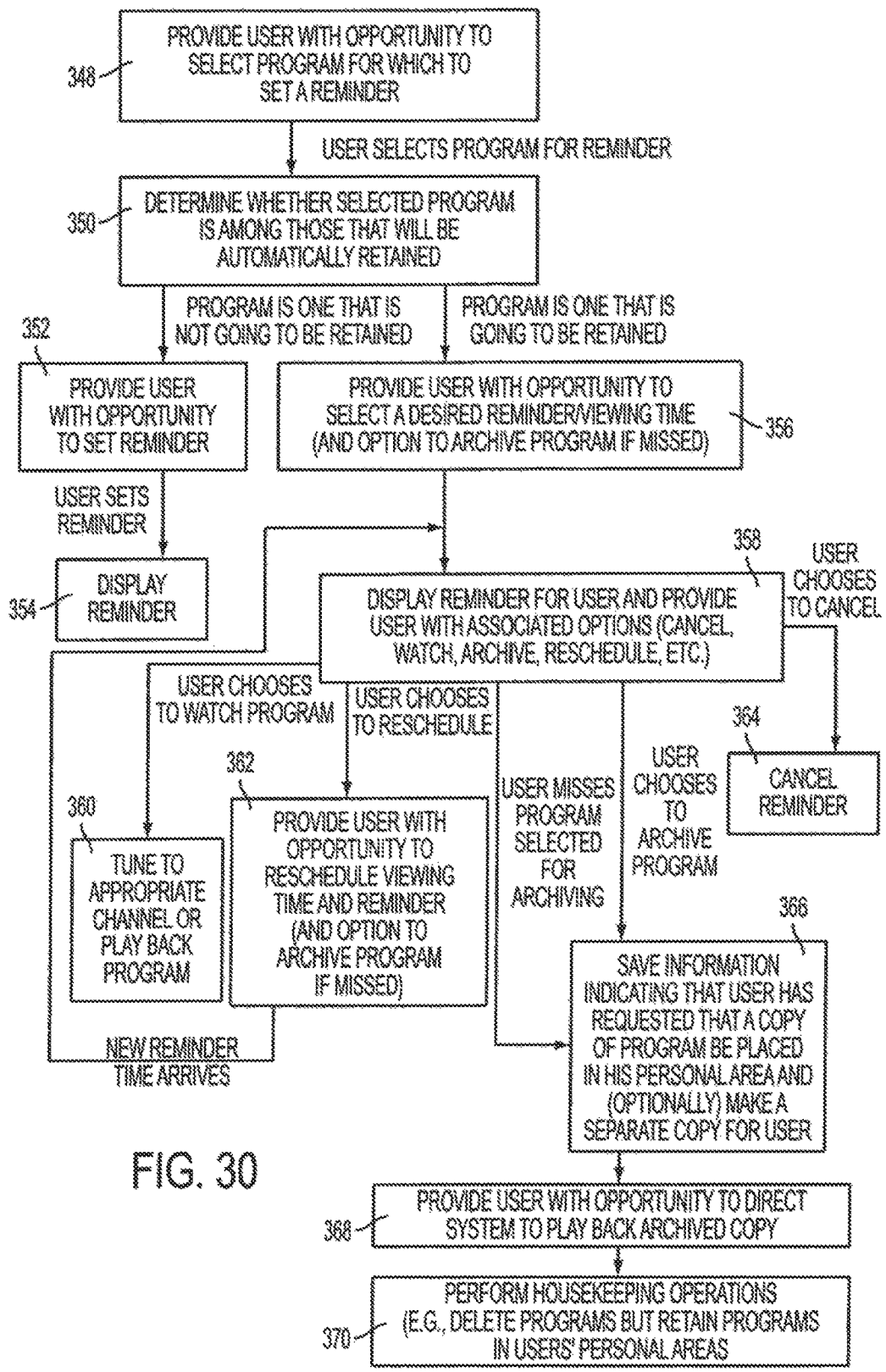
FIG. 30 is a flow chart of illustrative steps involved in handling reminder and viewing rescheduling in a network-based or local personal video recorder environment in which some broadcast programming is being recorded in accordance with the present invention.
Figure 31:
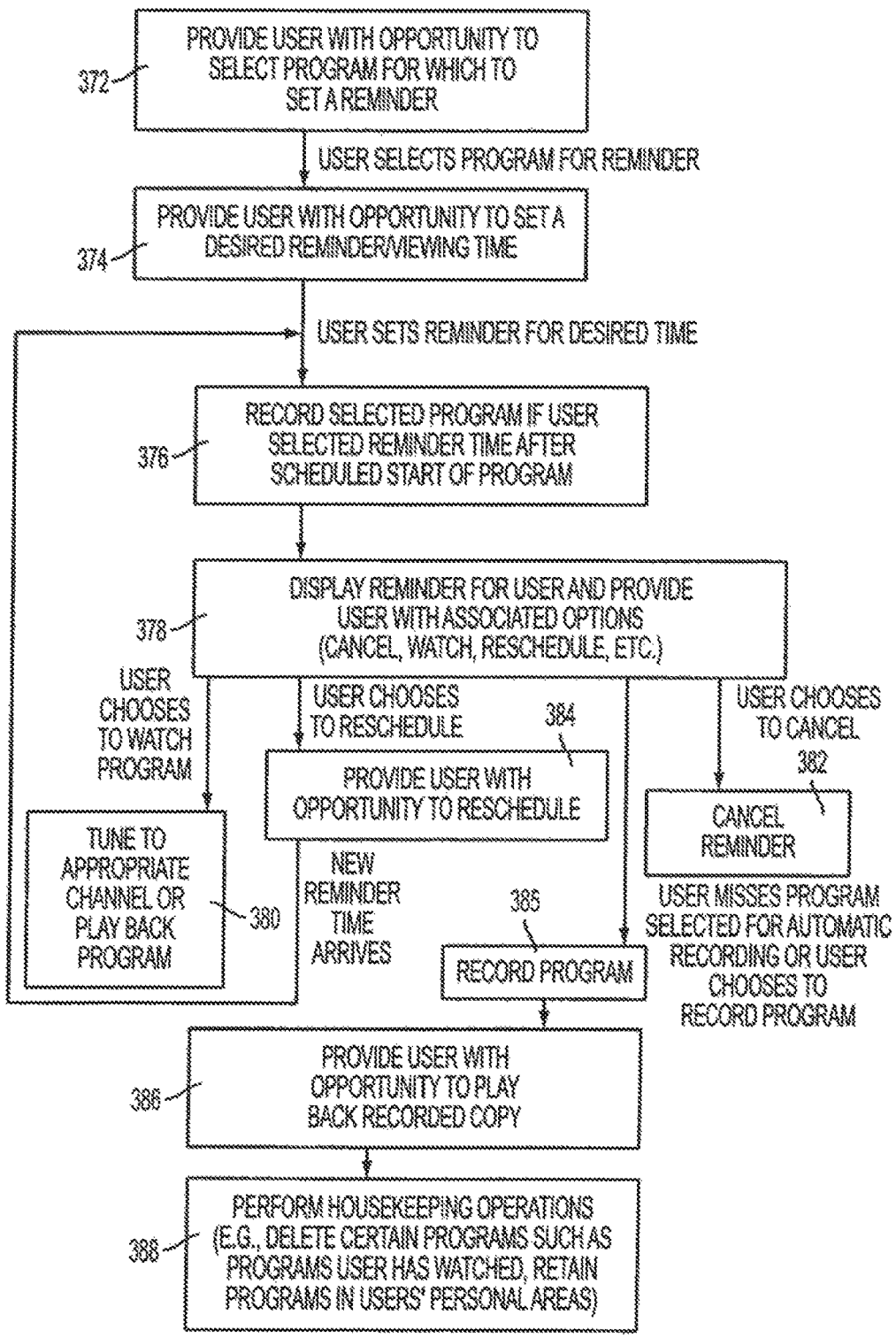
FIG. 31 is a flow chart of illustrative steps involved in handling reminder and viewing rescheduling in a network-based or local personal video recorder environment in which broadcast programming is recorded based on user requests in accordance with the present invention.

Illustrative steps involved in implementing the deferred-reminders feature of the network-based video recorder in different system environments are shown in FIGS. 29, 30, and 31. The flow chart of FIG. 29 shows steps used in a system environment in which copies of all or substantially all scheduled programming are automatically retained by the network-based video recorder. The flow chart of FIG. 30 shows steps used in a system environment in which some of the scheduled broadcast programming is automatically retained and some of this programming is not retained (programs can also be recorded at a user's request). The flow chart of FIG. 31 shows steps used in a system environment in which programs are recorded at the request of the user (programming can also be retained automatically). The flow charts shown in FIGS. 29, 30, and 31 may also describe system environments in which recording, retention, and storage of broadcast programming may occur on local equipment, such as a local personal video recorder.

In one suitable arrangement, copies of all broadcast programs are automatically retained on the system. With this type of arrangement, users can use the network-based or local personal video recorder capabilities of system 10 to play back copies of programs of interest. The user may be provided with a personal area on the network. Copies of programs that the user is interested in may be stored (as virtual copies or as separate real copies) in the user's personal area or on the local equipment. The process of making a system copy of a program appear in the user's personal set of listings may be referred to as archiving.

Due to storage restrictions, it may not be desirable to maintain copies of all broadcast programs in the network-based or local personal video recorder for an indefinite period. Accordingly, these programs may be erased or moved to a more remote storage location after an appropriate time has elapsed from their initial broadcast. To avoid losing ready access to a desired program, the user may wish to archive the program in that user's personal area or local PVR. The user may be charged a one-time or periodic fee for this service by the system. Archived virtual or real copies can be maintained on the network or local PVR for ready access by the user. Copies that are not archived may be impossible or at least more difficult to access.

Steps involved in providing a user with the ability to use network-based or local personal video recorder functions to reschedule reminders and archive missed programs are shown in the flow chart of FIG. 29. In conjunction with the steps shown in FIG. 29, the system 10 is continually retaining copies of all television programs being provided to the users (e.g., by maintaining digital copies on server 56 of all of the programs distributed to the users via television distribution facility 14).

At step 330, the user may be provided with an opportunity to select a program for which to set a reminder. For example, the interactive television application (e.g., the program guide) may display a screen containing program listings such as the screen of FIG. 8. The user may select a desired program for which to set a reminder from this screen.

After the user has selected a desired program, the interactive television application may provide the user with an opportunity to select a desired reminder and viewing time at step 332. An on-screen display arrangement of the types shown in FIGS. 24, 25, and 26 may be used if desired. The user may also be provided with an opportunity to interact with an archive-if-missed option such as option 286 of FIG. 24 at step 332. Archiving operations may also be performed by default. If the user directs the system to archive missed programs, the programs will not only be automatically retained by the system as part of the system's automatic retention of all broadcast programming, but will also be archived to the user's personal area or local PVR (e.g., for a length of time determined by the user's payment of appropriate fees, etc.).

In response to step 332, the user may select a time for the reminder that coincides with the originally-scheduled broadcast time for the desired program or may select a deferred reminder time. The selection of the deferred reminder time is made possible by the network-based or local personal video recorder functions of system 10. When the user-selected time arrives, a reminder may be displayed for the user at step 334.

The reminder that is displayed by the interactive television application at step 334 may be, for example, a reminder of the type shown in FIG. 27 or any other suitable reminder. The reminder may include options such as the options 304 of FIG. 27 that allow the user to watch the desired program immediately, to defer viewing (and reschedule the reminder), to cancel the reminder, and to archive the program immediately to the user's personal area or local PVR (e.g., if the user does not anticipate watching the program in the near future).

If the user chooses to watch the program immediately, the interactive television application may display the program for the user on the user's equipment 18 at step 336. If the program is currently being broadcast (e.g., because the reminder was set for the originally-scheduled broadcast time), the interactive television application may tune the user's equipment to the appropriate television channel to receive that program. The received program may be displayed on the user's monitor (e.g., the user's television screen). If the program is not currently being broadcast (e.g., because the user is relying on the network-based video recorder functions of the system to retrieve a saved version of the program), the program may be played back for the user using the network-based video recorder. A playback arrangement of the type shown in FIG. 21 or any other suitable arrangement may be used to play back the desired program for the user from the network-based or local personal video recorder.

If, in response to step 334, the user chose to reschedule the reminder (e.g., the user selected a "watch later" option to change the reminder to a later time because the user was not yet ready to view the program), the user may, at step 338, be provided with an opportunity to interact with on-screen reminder-time rescheduling options of the type shown in FIG. 28. As shown in FIG. 28, the user may also be presented with an on-screen option 328 to schedule an automatic network-based or local archiving operation in the event that the user misses the rescheduled program broadcast.

After rescheduling the reminder at step 338, control loops back to step 334. When the new reminder time arrives, the system may therefore display a new reminder for the user at step 334.

If an original or rescheduled reminder time arrives and the user is watching television or otherwise using user equipment 18, the user may choose to watch the program that is the subject of the reminder at step 336 or may cancel the reminder (step 340). The user may also select an option such as archive to personal area or local PVR option 314 of FIG. 27 to direct the interactive television application to archive a copy of the program to the user's personal area or local PVR at step 342. A copy of the program may also be archived to the user's personal area or local PVR at step 342 if the user misses a program that was selected for archiving (e.g., using an option such as option 286 of FIG. 24). No reminder need actually be displayed at step 334 if the user's display is not active at the reminder time (e.g., in the situation in which the user is missing the program).

Alternatively, or in addition to the above, if an original or rescheduled reminder time arrives and the user does not respond to or otherwise acknowledge the displayed reminder for some defined period of time, the interactive television application may be configured to assume that the user will miss or has missed the program. Similarly, if the user is engaged in an "uninterruptible" activity (e.g., the user is engaged in or entering a purchase transaction) when an original or rescheduled reminder time arrives, the application may also assume that the user will miss or has missed the program. In either situation, the application may subsequently perform an action appropriate for when the user has missed the program (e.g., archiving the program if the user previously set an archive-if-missed option).

When the user selects an archive option such as archive option 314 of FIG. 27 or when the user previously set an archive-if-missed option and the user fails to watch the program in time, the system may create an archive copy of the program at step 342. The archive copy may be made by creating an actual extra copy of the program for the user or by updating an appropriate database or otherwise storing information that indicates that the user has archived a copy of the program.

Regardless of whether a real archive copy or a virtual archive copy of the program is created for the user, the user's personal area on the network or the local PVR may be updated accordingly. For example, the user's lists of recordings that are provided by the interactive television application such as the list of FIG. 20*a* may be updated to reflect the availability of the archived copy of the program. This type of on-screen listing arrangement may be used to allow the user to request that a given program recording (archive copy) be played back to the user (step 344).

Figure 32:
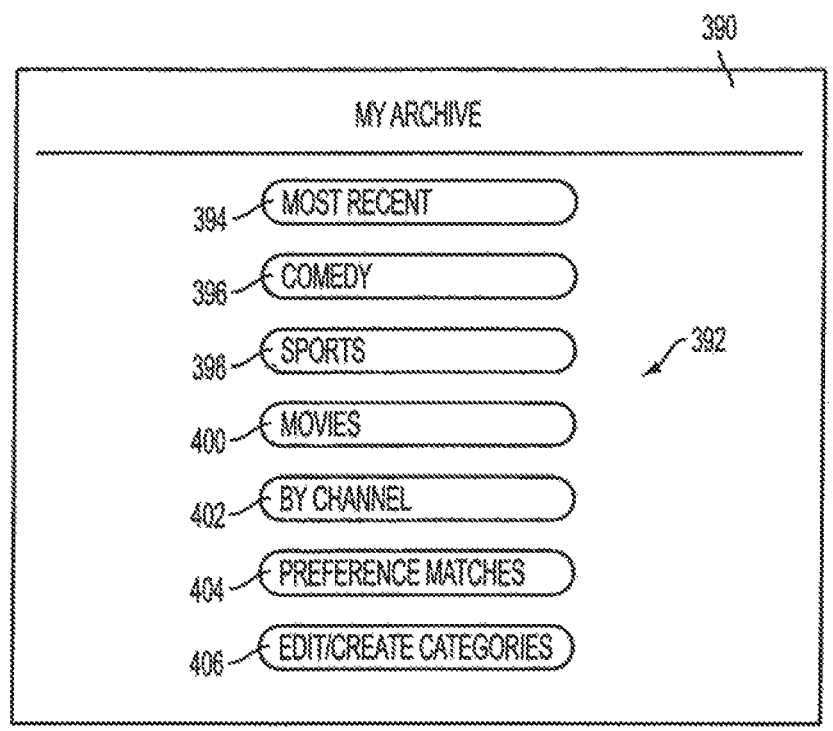
FIG. 32 is an illustrative display screen showing how archived content in a user's personal area on the network or local PVR may be organized according to programming categories in accordance with the present invention.

Another suitable arrangement for providing the user with access to archived programs is shown in FIG. 32. With the arrangement of FIG. 32, the interactive television application may display a screen 390 of archive category options 392. The user may select most recent option 394 to access listings for recently archived programs. Options such as options 396, 398, and 400 may be used to access lists of archived programs according to their genre. Genre information for recorded programs may be obtained from data source 30 and stored in a program listings database for use by the interactive television application. By channel option 402 may be used to display a list of archived programs ordered by their associated television channels.

Preference matches option 404 may be selected when the use desires to view programs that match the user's preferences. The user's preferences may be stored in a preference profile. Information on the user's preferences may be gathered by the interactive television application by monitoring the user's interactions with the interactive television application, by manual input (e.g., by the user), by surveys (on-line, telephone, through the user equipment, etc.), or using any other suitable approach.

Edit/create categories option 406 may be used to provide access to editing functions. The user may use option 406 to create new options 392, to delete undesired options 392, and to otherwise customize the user interface with archived content.

System housekeeping operations (step 346 of FIG. 29) may be performed at any suitable time. Such operations may, for example, involve deleting certain programs while retaining programs that users have paid to maintain in their personal areas. The interactive television application may be used to provide the user with opportunities to extend storage (e.g., upon payment of an additional fee) or to otherwise assist during housekeeping operations.

The flow chart of FIG. 30 shows steps involved in operating the interactive television application in a system environment in which some of the scheduled broadcast programming is automatically retained and some of this programming is not retained. With this type of arrangement, users can use the network-based or local personal video recorder capabilities of system 10 to play back copies of at least some programs of interest. Other programs of interest may be watched in real time as broadcast programs. The user may be provided with a personal area on the network. Copies of programs that are available for archiving (i.e., those programs for which copies are automatically maintained) may be stored (as virtual copies or as separate real copies) in the user's personal area or in the local PVR.

Programs that are not stored automatically by the system may be stored upon user request. Periodic housekeeping operations may be used to delete or otherwise remove certain programs from the primary storage areas of the network-based or local personal video recorder. To avoid losing ready access to a desired program, the user may wish to archive the program in that user's personal area or local PVR. The user may be charged a one-time or periodic fee for this service by the system. Archived virtual or real copies can be maintained on the network or local PVR for ready access by the user. Copies that are not archived may be impossible or at least more difficult to access. In conjunction with the steps shown in FIG. 30, the system 10 may continually retain copies of some of the television programs being provided to the users (e.g., by maintaining digital copies on server 56 of these programs as they are distributed to the users via television distribution facility 14).

At step 348, the user may be provided with an opportunity to select a program for which to set a reminder. For example, the interactive television application (e.g., the program guide) may display a screen containing program listings such as the screen of FIG. 8. The user may select a desired program for which to set a reminder from this screen.

At step 350, the interactive television application may determine whether the selected program is among those that are to be automatically retained using the network-based or local personal video recorder. If the selected program is not among those for which a copy is to be automatically retained, the user may be provided with an opportunity to set the reminder at step 352. For example, the user may be provided with a screen such as the set reminders screen of FIG. 12. The user may use this screen to set a reminder for the program at the regularly scheduled broadcast time for that program. Even if the selected program is not scheduled for automatic recording, the user may be able to select a delayed reminder option. In making such a selection, the interactive television application may be record the selected program for which the delayed reminder was set by using the network-based or local personal video recorder capabilities of the system.

When the time for the program arrives, the interactive television application may display the reminder for the user at step 354. For example, the interactive television application may display a reminder such as the reminder of FIG. 13. If desired, the set reminder screen provided at step 352 may include an option that the user may select to direct the network-based or local personal video recorder to record the program into the user's personal area or local PVR (as a real or virtual copy) in the event that the user does not watch the program.

The reminder screens such as the reminder list display of FIG. 13 that are displayed by the interactive television application may, if desired, include an option that directs the interactive television application to record the program associated with the reminder. The program may be recorded locally when network-based recording is not available. At step 354, the user may be provided with a reminder that allows deferred viewing (using the network-based or local personal video recorder functions of the system). User-initiated recording of missed or deferred programs that are not automatically retained is described further in connection with FIG. 31.

If it is determined at step 350 that the program selected by the user is one for which a copy of the program is going to be automatically retained, the user may be provided with an opportunity to select a desired reminder time for the program at step 356. Because a copy of the program is being retained past the originally-scheduled broadcast time, it is not necessary to restrict the reminder time to the time originally scheduled for broadcasting the program. Rather, an arrangement such as the on-screen menu arrangements of FIGS. 24, 25, and 26 may be used to select a reminder time that is at the scheduled broadcast time or that is later than the scheduled broadcast time (i.e., at a time for which no broadcast of the program is scheduled).

The user may also be provided with an opportunity to interact with an archive-if-missed option such as option 286 of FIG. 24 at step 356. Archiving operations may also be performed by default. If the user directs the system to archive missed programs, the programs will not only be automatically retained by the system as part of the system's automatic retention of certain broadcast programming, but will also be archived to the user's personal area or local PVR (e.g., for a length of time determined by the user's payment of appropriate fees, etc.).

Using the on-screen options provided during step 356, the user may select a time for the reminder that coincides with the originally-scheduled broadcast time for the desired program or may select a deferred reminder time. When the user-selected time arrives, a reminder may be displayed for the user at step 358.

The reminder that is displayed by the interactive television application at step 358 may be, for example, a reminder of the type shown in FIG. 27 or any other suitable reminder. The reminder may include options such as the options 304 of FIG. 27 that allow the user to watch the desired program immediately, to defer viewing (and reschedule the reminder), to cancel the reminder, and to archive the program immediately to the user's personal area or local PVR (e.g., if the user does not anticipate watching the program in the near future).

If the user chooses to watch the program immediately, the interactive television application may display the program for the user on the user's equipment 18 at step 360. If the program is currently being broadcast (e.g., because the reminder was set for the originally-scheduled broadcast time), the interactive television application may tune the user's equipment to the appropriate television channel to receive that program at step 360. The received program may be displayed on the user's monitor (e.g., the user's television screen). If the program is not currently being broadcast (e.g., because the user is relying on the network-based or local personal video recorder functions of the system to retrieve a saved version of the program), the program may be played back for the user using the network-based or local personal video recorder at step 360. A playback arrangement of the type shown in FIG. 21 or any other suitable arrangement may be used to play back the desired program for the user from the network-based or local personal video recorder.

If, in response to step 358, the user chose to reschedule the reminder (e.g., the user selected a "watch later" option to change the reminder to a later time because the user was not yet ready to view the program), the user may, at step 362, be provided with an opportunity to interact with on-screen reminder-time rescheduling options of the type shown in FIG. 28. As shown in FIG. 28, the user may also be presented with an on-screen option to schedule an automatic archiving operation in the event that the user misses the rescheduled program broadcast.

After rescheduling the reminder at step 362, control loops back to step 358. When the new reminder time arrives, the system may therefore display a new reminder for the user at step 358.

If an original or rescheduled reminder time arrives and the user is watching television or otherwise using user equipment 18, the user may choose to watch the program that is the subject of the reminder, thereby directing the interactive television application to tune to the appropriate channel or play back the program at step 360. The user may select an option to cancel the reminder, thereby directing the interactive television application to cancel the reminder at step 364. The user may also select an option such as archive-to-personal-area option 314 of FIG. 27 to direct the interactive television application to archive a copy of the program to the user's personal area at step 366. Alternatively, or in addition, the absence of a response or selection from the user after the reminder has been displayed for some period of time may also direct the interactive television application to archive a copy of the program to the user's personal area at step 366. A copy of the program may also be archived to the user's personal area or local PVR at step 366 if the user misses a program that was selected for archiving (e.g., using an option such as option 286 of FIG. 24). No reminder need actually be displayed at step 358 if the user's display is not active at the reminder time (e.g., in the situation in which the user is missing the program).

When the user selects an archive option such as archive option 314 of FIG. 27 or when the user previously set an archive-if-missed option and the user fails to watch the program in time, the system may create an archive copy of the program at step 366. The archive copy may be made by creating an actual extra copy of the program for the user or by updating an appropriate database or otherwise storing information that indicates that the user has archived a copy of the program. The archive copy may be stored in the user's personal area on the network or on the local PVR.

Regardless of whether a real archive copy or a virtual archive copy of the program is created for the user, the user's personal area on the network or local PVR may be updated accordingly. For example, the user's lists of recordings that are provided by the interactive television application such as the list of FIG. 20*a* may be updated to reflect the availability of the archived copy of the program. This type of on-screen listing arrangement or any other suitable arrangement such as the arrangement described in connection with FIG. 32 may be used to allow the user to request that a given program recording (archive copy) be played back to the user (step 368).

System housekeeping operations (step 370) may be performed at any suitable time. Such operations may, for example, involve deleting certain programs while retaining programs that users have paid to maintain in their personal areas or local PVR. The interactive television application may be used to provide the user with opportunities to extend storage (e.g., upon payment of an additional fee) or to otherwise assist during housekeeping operations.

The flow chart of FIG. 31 shows steps involved in operating the interactive television application in a system environment in which scheduled broadcast programming is not automatically retained, but is available for recording using the network-based or local personal video recorder capabilities of the system. With this type of arrangement, users can use the network-based or local personal video recorder capabilities of system 10 to record and play back programs of interest, but copies of programs are generally not stored unless requested by at least one (or other suitable number) of the users (e.g., at least one or some of the users associated with a given television distribution facility 14). Other programs of interest may be watched in real time as broadcast programs. The user may be provided with a personal area on the network or on the local PVR. Recordings of programs that are made at the request of the user may be stored (as virtual copies or as separate real copies) in the user's personal area or local PVR.

Periodic housekeeping operations may be used to delete or otherwise remove certain programs from the network, the user's personal area, or the local PVR.

At step 372 of FIG. 31, the user may be provided with an opportunity to select a program for which to set a reminder. For example, the interactive television application (e.g., the program guide) may display a screen containing program listings such as the screen of FIG. 8. The user may select a desired program for which to set a reminder from this screen (e.g., by positioning a highlight region on a desired program and pressing a remote control OK key).

The user may be provided with an opportunity to select a desired reminder time for the program at step 374. Because the program may be recorded using the network-based or local personal video recorder capabilities of system 10, it is not necessary to restrict the reminder time to the time originally scheduled for broadcasting the program. Rather, an arrangement such as the on-screen menu arrangements of FIGS. 24, 25, and 26 may be used to select a reminder time that is at the scheduled broadcast time or that is later than the scheduled broadcast time (i.e., at a time at which the program is not being broadcast).

During step 374, the user may also be provided with an opportunity to interact with a record-if-missed option. This type of option may be displayed using the same type of arrangement used for option 286 of FIG. 24. Missed programs may also be recorded by default.

If the user sets up a reminder time that is later than the scheduled broadcast time for the selected program, the program may be recorded for later playback at step 376 using the network-based or local personal video recorder capabilities of system 10. At step 378, at the reminder time set by the user, the interactive television application may display a reminder for the user. The reminder may, for example, be a reminder of the type shown in FIG. 27. Options such as options 304 may be included in the reminder that allow the user to watch the program immediately, to watch later (and therefore reschedule the reminder), to cancel or ignore the reminder, and to record a copy of the program (e.g., by recording a copy of the program in the user's personal area of the network or local PVR).

If the user chooses to watch the program immediately, the interactive television application may display the program for the user on the user's equipment 18 at step 380. If the program is currently being broadcast (e.g., because the reminder was set for the originally-scheduled broadcast time), the interactive television application may tune the user's equipment to the appropriate television channel to receive that program at step 380. The received program may be displayed on the user's monitor (e.g., the user's television screen). If the program is not currently being broadcast (e.g., because the user is relying on the network-based or local personal video recorder functions of the system to retrieve the version of the program that was recorded at step 376), the program may be played back for the user using the network-based or local personal video recorder at step 380. A playback arrangement of the type shown in FIG. 21 or any other suitable arrangement may be used to play back the desired program for the user from the network-based or local personal video recorder.

If, in response to step 378, the user chose to reschedule the reminder (e.g., the user selected a "watch later" option to change the reminder to a later time because the user was not yet ready to view the program), the user may, at step 384, be provided with an opportunity to interact with on-screen reminder-time rescheduling options of the type shown in FIG. 28. As shown in FIG. 28, the user may also be presented with an on-screen option to schedule an automatic recording operation in the event that the user misses the rescheduled program broadcast.

After rescheduling the reminder at step 384, control loops back to step 378. When the new reminder time arrives, the system may therefore display a new reminder for the user at step 378.

If an original or rescheduled reminder time arrives and the user is watching television or otherwise using user equipment 18, the user may choose to watch the program that is the subject of the reminder at step 380 or may cancel the reminder (step 382). If the user directed the interactive television application to record missed programs (e.g., during the user's interactions with the reminder set-up options displayed during step 374) or if the user selected a record option from the reminder display (e.g., a record option displayed in place of archive option 314 of FIG. 27), the program may be recorded at step 385 (if the program was not already recorded at step 376). The recording of the program may be made by creating an actual copy of the program for the user in the user's personal area or local PVR, or by creating a shared copy (or a pointer to a shared copy) that is accessible to one or more users in the system. If the recording is made using a virtual copy of the program, step 385 may involve updating an appropriate database or otherwise storing information that indicates that the user has been provided with a recording of the program.

Regardless of whether a real recording or a virtual recording of the program is created for the user, the user's personal area on the network or local PVR may be updated accordingly. For example, the user's lists of recordings that are provided by the interactive television application such as the list of FIG. 20a may be updated to reflect the availability of the recording of the program. This type of on-screen listing arrangement or any other suitable arrangement may be used to allow the user to request that a given program recording be played back to the user (step 386). For example, an arrangement of the type shown in FIG. 32 (described earlier in the context of archived recordings) may be used to access user-requested network-based or local video recordings.

System housekeeping operations (step 388) may be performed at any suitable time. Such operations may, for example, involve deleting certain programs while retaining programs that users have paid to maintain in their personal areas or local PVR. The interactive television application may be used to provide the user with opportunities to extend storage (e.g., upon payment of an additional fee) or to otherwise assist during housekeeping operations.

Figure 33:
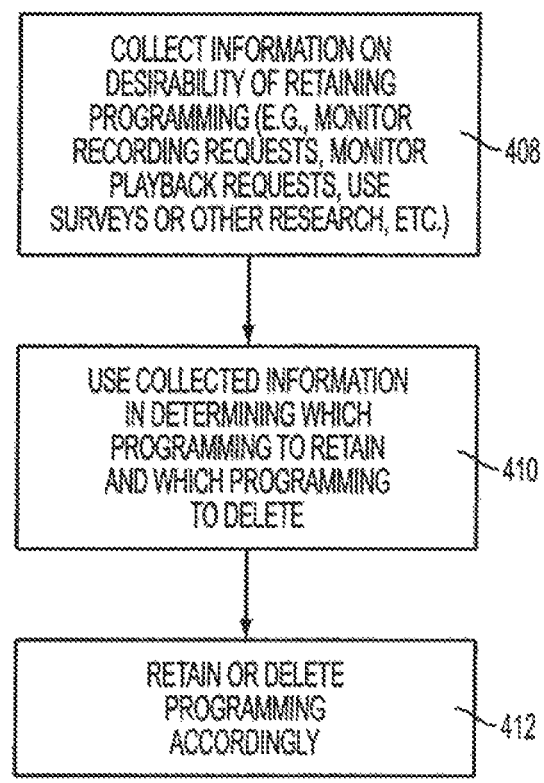
FIG. 33 is a flow chart of illustrative steps involved in using information on the desirability of retaining certain programming to determine which programs to delete and which to retain in storage in accordance with the present invention.

Any suitable approach may be used for supporting the housekeeping operations described in connection with step 346 (FIG. 29), step 370 (FIG. 30), and step 388 (FIG. 31). Programs may be retained for the same length of time or for different lengths of time. The retention times for various programs may be supplied by the content owners associated with programming sources 12, by the operator of facility 14, or by any other suitable entity. An illustrative approach for using system 10 in determining suitable retention times for programs stored on the network (e.g., on server 36, server 56, or equipment at a service provider such as service provider 50) is shown in FIG. 33. At step 408, the interactive television application may be used to collect information on the desirability of retaining certain programming. The application may, for example, monitor how often certain programs are recorded or played back by the users in the system. The interactive television application may also obtain information from users in the form of electronic surveys or from external sources. This information may be used in determining the popularity of the programs for which copies have been retained. At step 410, the information that has been gathered at step 408 may be used to determine which programming to retain and which programming to delete. For example, programs whose recording and playback request numbers fall below a predetermined threshold may be allowed to expire, whereas programs with high recording and request numbers may be retained.

After determining which programming to retain and which programming to delete at step 410, the interactive television application may retain and delete this programming as appropriate at step 412.

The approach for deleting and retaining programs that is shown in FIG. 33 is merely illustrative. Any suitable approach may be used if desired.

The length of time that different programs are retained on the network may generally be different for different types of program. For example, situation comedies (which users may be interested in viewing if they miss an episode) may be retained longer than news (which becomes of less interest as time passes).

A particular television series (e.g., ER) may be identified as being of interest, and episodes of that series (or of that series on a particular channel) may be retained longer than other programs.

A particular program (e.g., the Super Bowl) may be identified as being likely to be popular (even in the absence of user request information) and may be retained for a longer period than regular sports programming.

An advertiser or program provider may wish to ensure that a specific program or programs on a specific channel are made available to users for an extended period of time (and may be charged for the privilege).

A program provider may specify that recordings of a particular program or channel not be made available at all by the network-based or local personal video recorder. This service may also be charged for.

Programs may be designated as being of lesser viewer interest and may be retained for a shorter period of time.

Retention time may be based on program type. For example, news may be retained for a shorter time and drama or comedy programs may be retained for a longer time. Similarly, certain channels may be given less or more retention time.

In providing the functionalities described above, the operator may interact with system 10 (e.g., through a computer terminal located at television distribution facility 14 or linked to system 10 through communications network 34). The operator or other suitable entity may specify specific programs, series, channels, program categories, and other attributes the system may use in determining which programs to retain and which to delete.

With one suitable approach, system 10 may display a program schedule grid for the operator. The operator may select a specific program or channel. The operator may select other attributes from a list of attributes. The operator may also select combinations of programs, series, channels, and other attributes. The operator may specify a retention time for specific programs and programming that match the selected criteria. This may be done by specifying an absolute number (or value), by specifying a number of hours or a percentage relative to other programming, or by using any other suitable technique. The operator may also assign a priority to the operator's selections. In response, the system may automatically allocate storage space (e.g., on server 36, server 56, or storage on equipment at service provider 50) for the programming based on their relative priorities.

The system may monitor which programs are played back with the network-based or local personal video recorder and which programs have been recorded. Retention time may be based on the number of playback requests (or other viewings) across the network (or across multiple networks). For example, if no users request a specific program, it may be removed from storage in a relatively short period of time. If a number of users request it, the program may be retained longer.

If desired, the program may be retained until it has not been requested for a predefined period of time, or until the rate of requests falls below a predefined number per hour. Alternatively, priority for program retention may be determined based on the rate of viewer requests for the programs. This priority may be used alone or in combination with an operator-specified priority for some or all programs, series, channels, categories, and other attributes.

If desired, a program rating service, such as Nielsen ratings, may be used to assess the relative ratings of recurring programs, or of specific channel and time combinations. These relative ratings may be used to prioritize the retention time of the programs. If desired, this technique may be used in combination with operator-entered priorities and viewer-request-based priorities.

These techniques may be provided in combination with a viewer-request-based system. For example, programs may be recorded based on specific viewer requests and may be recorded across a predetermined set of channels. The retention time of recorded programs may be based on a combination of viewer requests, operator-specified times and priorities, and ratings-adjusted priorities.

If desired, some or all of the deleted programs may be moved to some of the user equipment devices 18. User equipment 18 may also be used to record missed programs, to handle the archiving of programs that have been automatically saved on the server, or to perform any of the other video recorder recording or playback functions described above.

It is understood that the foregoing features, such as reminders, storing of programs, archiving of programs, and other associated features described above may used in conjunction with programs stored or archived on network-based or local personal video recorders. It is also understood that video recorders may include either or both network-based video recorders and local personal video recorders. These features may also be used for programs in systems wherein suitable combinations of network-based and local arrangements are implemented.

The foregoing is merely illustrative of the principles of this invention and various modifications can be made by those skilled in the art without departing from the scope and spirit of the invention.

What is claimed is:

1. A method for storing a media asset for a predetermined period of time that is based on a type of the media asset, the method comprising:

receiving a request to store the media asset;

based on receiving the request, extracting metadata relating to the media asset, the metadata comprising a plurality of fields;

determining whether a type field is present in the plurality of fields of the metadata; and based on determining that the type field is present in the plurality of fields of the metadata:

determining a type of the media asset from data within the type field;

comparing the type to a plurality of candidate types, wherein each candidate type corresponds to a respective candidate retention period for retaining the media asset in storage;

based on the comparing, assigning a retention period corresponding to a matching respective candidate retention period;

storing at a time of recordation the media asset in memory of a server remote from a user equipment on which the request was received;
determining whether an amount of time corresponding to the retention period has elapsed since the time of recordation; and
based on determining that the amount of time corresponding to the retention period has elapsed since the time of recordation, deleting the recording from the memory of the server and transferring to a memory of the user equipment.

2. The method of claim 1, further comprising:
receiving a request to playback the media asset at a first time, wherein the first time is after a scheduled start-time of the media asset;
based on receiving the request to playback, determining that the scheduled start-time of the media asset has passed; and
based on determining that the start-time of the media asset has passed, generating for display a portion of the stored media asset.

3. The method of claim 1, wherein storing the media asset in memory at the time of recordation further comprises:
storing the media asset in the memory on a server remote to user equipment at which the request to store the media asset was received;
receiving a request, at the remote server, from the user equipment, to playback the media asset; and
transmitting the stored media asset from the remote server to the user equipment device base on receiving the request.

4. The method of claim 1, wherein receiving the request to store the media asset further comprises:
determining, at a server remote to user equipment at which the request to store the media asset was received, whether the media asset matches a criterion, wherein the criterion is not set by a user; and
in response to determining that the media asset matches the criterion:
storing the media asset in the memory;
in response to determining that the media asset does not match the criterion
refraining from storing the media asset in the memory.

5. The method of claim 1, wherein receiving the request to store the media asset further comprises:
determining, whether the media asset is part of a plurality of media assets that are scheduled to be automatically stored in the memory;
based on determining that the media asset is not part of the plurality of media assets:
generating for display a selectable option on user equipment to store the media asset;
receiving a selection of the user selectable option;
based on the selection, storing the media asset in the memory.

6. A system for storing a media asset for a predetermined period of time that is based on a type of the media asset, the system comprising:
control circuitry configured to:
receive a request to store the media asset;
based on receiving the request, extract metadata relating to the media asset, the metadata comprising a plurality of fields;
determine whether a type field is present in the plurality of fields of the metadata; and
based on determining that the type field is present in the plurality of fields of the metadata:
determine a type of the media asset from data within the type field;
compare the type to a plurality of candidate types, wherein each candidate type corresponds to a respective candidate retention period for retaining the media asset in storage;
based on the comparing, assign a retention period corresponding to a matching respective candidate retention period;
store at a time of recordation the media asset in memory of a server remote from a user equipment on which the request was received;
determine whether an amount of time corresponding to the retention period has elapsed since the time of recordation; and
based on determining that the amount of time corresponding to the retention period has elapsed since the time of recordation, delete the recording from the memory of the server and transfer to a memory of the user equipment.

7. The system of claim 6, wherein the control circuitry is further configured to:
receive a request to playback the media asset at a first time, wherein the first time is after a scheduled start-time of the media asset;
based on receiving the request to playback, determine that the scheduled start-time of the media asset has passed; and
based on determining that the start-time of the media asset has passed, generate for display a portion of the stored media asset.

8. The system of claim 6, wherein the control circuitry is further configured, when storing the media asset in memory, to:
store the media asset in the memory on a server remote to user equipment at which the request to store the media asset was received;
receive a request, at the remote server, from the user equipment, to playback the media asset; and
transmit the stored media asset from the remote server to the user equipment device base on receiving the request.

9. The system of claim 6, wherein control circuitry is further configured, when receiving the request to store the media asset, to:
determine, at a server remote to user equipment at which the request to store the media asset was received, whether the media asset matches a criterion, wherein the criterion is not set by a user;
based on determining that the media asset matches the criterion:
store the media asset in the memory; and
based on determining that the media asset does not match the criterion:
refrain from storing the media asset in the memory.

10. The system of claim 6, wherein control circuitry is further configured, when receiving the request to store the media asset, to:
determine, whether the media asset is part of a plurality of media assets that are scheduled to be automatically stored in the memory; and
based on determining that the media asset is not part of the plurality of media assets:
generate for display a selectable option on user equipment to store the media asset;
receive a selection of the user selectable option; and based on the selection, store the media asset in the memory.

11. A non-transitory computer-readable medium comprising memory with non-transitory computer readable instructions encoded thereon for storing a media asset for a predetermined period of time that is based on a type of the media asset, the instructions comprising:
- an instruction to receive a request to store the media asset;
- an instruction to, based on receiving the request, extract metadata relating to the media asset, the metadata comprising a plurality of fields;
- an instruction to determine whether a type field is present in the plurality of fields of the metadata; and
- an instruction to, based on determining that the type field is present in the plurality of fields of the metadata:
  - determine a type of the media asset from data within the type field;
  - compare the type to a plurality of candidate types, wherein each candidate type corresponds to a respective candidate retention period for retaining the media asset in storage;
  - based on the comparing, assign a retention period corresponding to a matching respective candidate retention period;
- an instruction to store at a time of recordation the media asset in memory of a server remote from a user equipment on which the request was received;
- an instruction to determine whether an amount of time corresponding to the retention period has elapsed since the time of recordation; and
- an instruction to, based on determining that the amount of time corresponding to the retention period has elapsed since the time of recordation, delete the recording from the memory of the server and transfer to a memory of the user equipment.

12. The non-transitory computer readable medium of claim 11, wherein the instructions further comprise:
- an instruction to receive a request to playback the media asset at a first time, wherein the first time is after a scheduled start-time of the media asset;
- an instruction to, based on receiving the request to playback, determine that the scheduled start-time of the media asset has passed; and
- an instruction to, based on determining that the start-time of the media asset has passed, generate for display a portion of the stored media asset.

13. The non-transitory computer readable medium of claim 11, wherein the instructions further comprise:
- an instruction to store the media asset in the memory on a server remote to user equipment at which the request to store the media asset was received;
- an instruction to receive a request, at the remote server, from the user equipment, to playback the media asset; and
- an instruction to transmit the stored media asset from the remote server to the user equipment device base on receiving the request.

14. The non-transitory computer readable medium of claim 11, wherein the instructions further comprise:
- an instruction to determine, at a server remote to user equipment at which the request to store the media asset was received, whether the media asset matches a criterion, wherein the criterion is not set by a user;
- an instruction to, based on determining that the media asset matches the criterion:
  store the media asset in the memory; and
- an instruction to, based on determining that the media asset does not match the criterion:
  refrain from storing the media asset in the memory.

15. The non-transitory computer readable medium of claim 11, wherein the instructions further comprise:
- an instruction to determine, whether the media asset is part of a plurality of media assets that are scheduled to be automatically stored in the memory; and
- an instruction to, based on determining that the media asset is not part of the plurality of media assets:
  generate for display a selectable option on user equipment to store the media asset;
  receive a selection of the user selectable option; and
  based on the selection, store the media asset in the memory.

* * * * *